Figure 2:
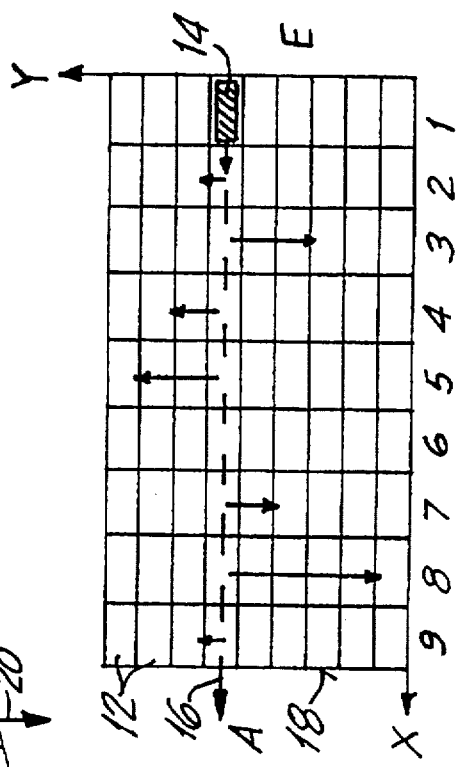

United States Patent [19]
Faller

[11] Patent Number: 5,707,199
[45] Date of Patent: Jan. 13, 1998

[54] APPARATUS FOR STORING OBJECTS IN A STORAGE BLOCK

[76] Inventor: Alexander Jun Faller, Rottenburger Strasse 14, D-84061 Ergoldsbach, Germany

[21] Appl. No.: 256,432
[22] PCT Filed: Nov. 10, 1993
[86] PCT No.: PCT/EP93/03147
 § 371 Date: Sep. 15, 1994
 § 102(e) Date: Sep. 15, 1994
[87] PCT Pub. No.: WO94/11599
 PCT Pub. Date: May 26, 1994

[30] Foreign Application Priority Data

Nov. 12, 1992 [DE] Germany ............... 42 38 239.4
Feb. 27, 1993 [DE] Germany ............... 43 06 241.5

[51] Int. Cl.$^6$ .................................................. B65G 1/04
[52] U.S. Cl. .................. 414/239; 414/28.6; 414/21; 414/236; 414/243; 414/261; 414/282; 414/255
[58] Field of Search .................. 364/478; 414/227, 414/231, 233, 234, 139.6, 235, 236, 237, 238, 264, 271, 239, 240, 140.3, 140.2, 241, 242, 243, 244, 245, 246, 252, 257, 259, 260, 255, 261, 262, 266, 273, 282, 281, 274, 286, 21, 331

[56] References Cited

U.S. PATENT DOCUMENTS

| | | |
|---|---|---|
| 3,091,188 | 5/1963 | Graham . |
| 3,115,257 | 12/1963 | Kubik ............................. 414/235 |
| 3,217,905 | 11/1965 | Frangos ......................... 414/239 |
| 3,554,389 | 1/1971 | Bright ............................ 414/234 X |
| 3,662,905 | 5/1972 | Mizuno et al. . |
| 4,768,914 | 9/1988 | Sing .............................. 414/235 X |
| 5,176,484 | 1/1993 | Kuperman et al. ............. 414/234 X |

FOREIGN PATENT DOCUMENTS

| | | | |
|---|---|---|---|
| 267409 | 12/1968 | Austria ............................ | 414/237 |
| 12733 | 6/1980 | European Pat. Off. . | |
| 2207841 | 6/1974 | France . | |
| 2645992 | 10/1990 | France . | |
| 2673923 | 9/1992 | France . | |
| 1293440 | 4/1969 | Germany . | |
| 1559158 | 9/1969 | Germany . | |
| 3121581 | 12/1982 | Germany . | |
| 3304932 | 10/1984 | Germany . | |
| 38072 | 4/1978 | Japan ............................... | 414/235 |
| 300473 | 12/1990 | Japan ............................... | 414/237 |
| 96577 | 4/1991 | Japan ............................... | 414/237 |
| 8202984 | 2/1984 | Netherlands .................... | 414/234 |
| 89/12152 | 12/1989 | WIPO . | |
| 93/09316 | 5/1993 | WIPO . | |

Primary Examiner—Frank E. Werner
Attorney, Agent, or Firm—Cohen, Pontani, Lieberman & Pavane

[57] ABSTRACT

A device is disclosed for storing objects in a storage block having identical storage places arranged behind, next to or above each other in the X, Y and Z directions and at least one lifting member associated to the storage block. Each storage place is equipped with a driving unit for moving the objects in the Y direction. Further driving units are provided for moving the objects in the X direction between the entrance area and the transfer side of the storage block. All successive rows in the X direction have at least one free storage place and one plane of the storage block is designed as a storage and return plane for empty pallets.

28 Claims, 26 Drawing Sheets

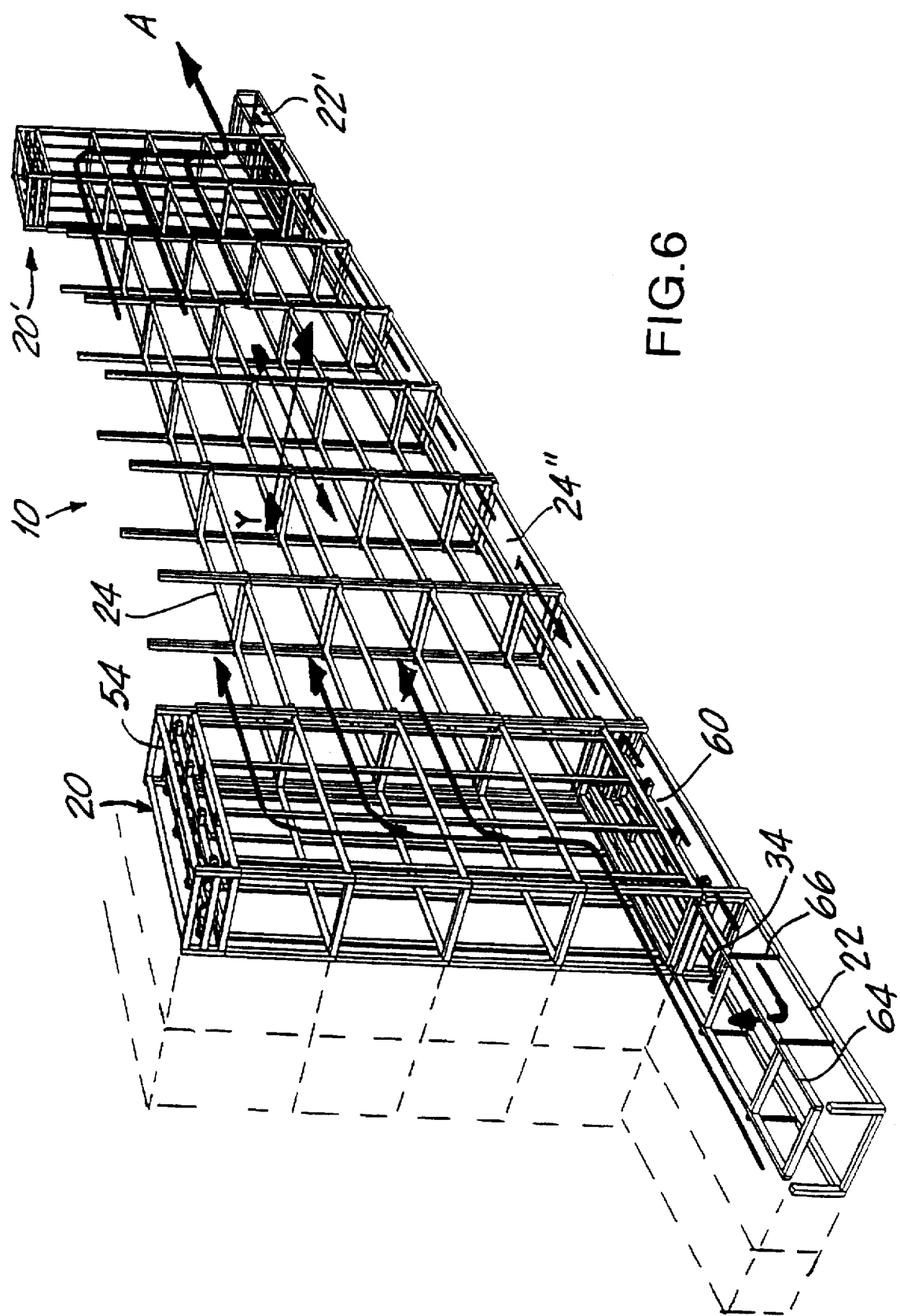

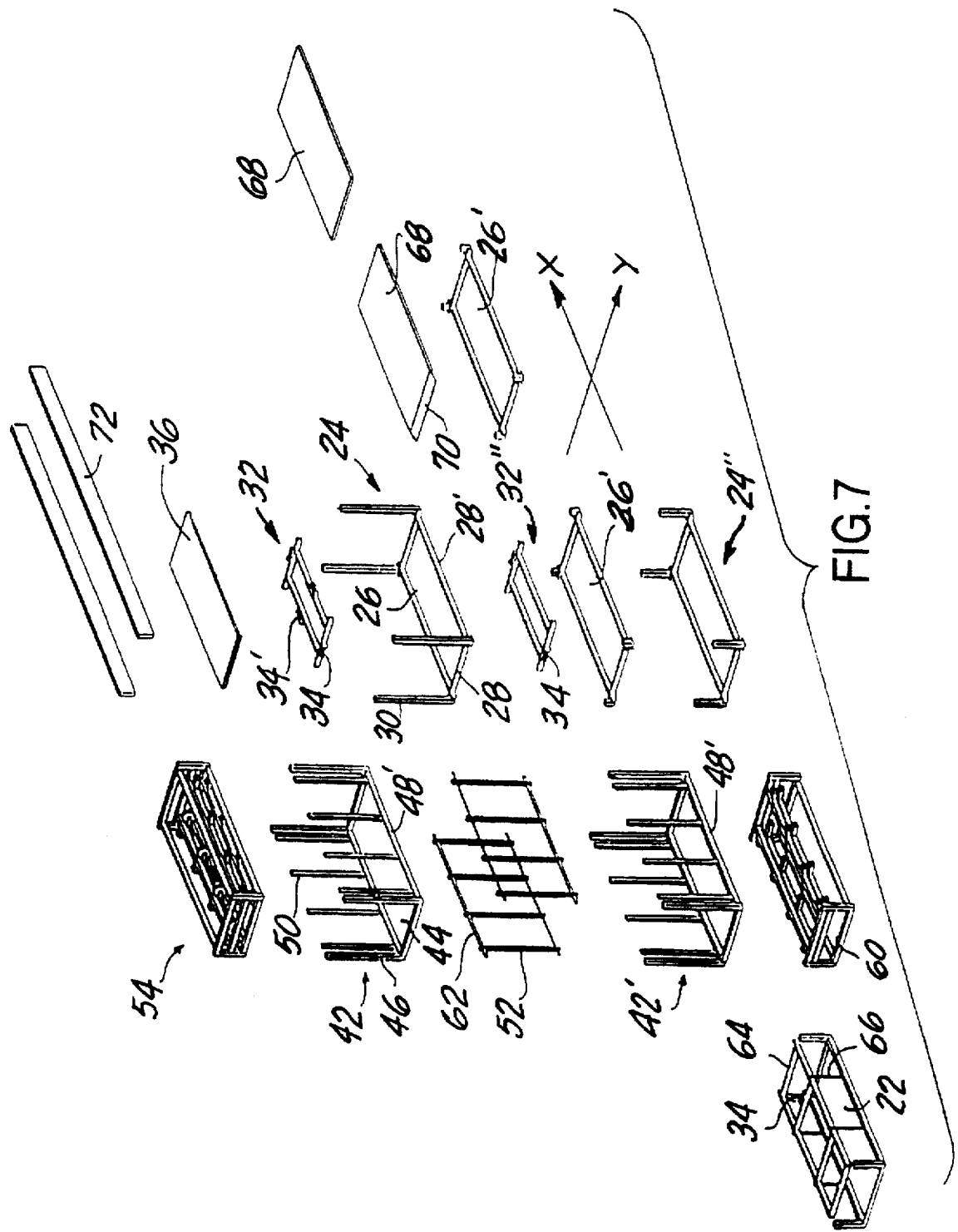

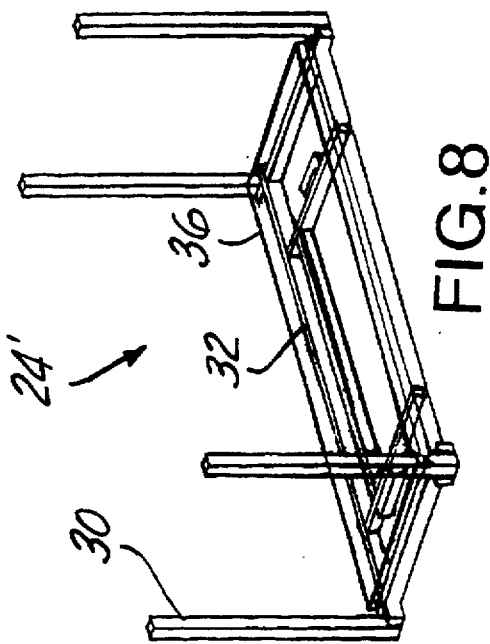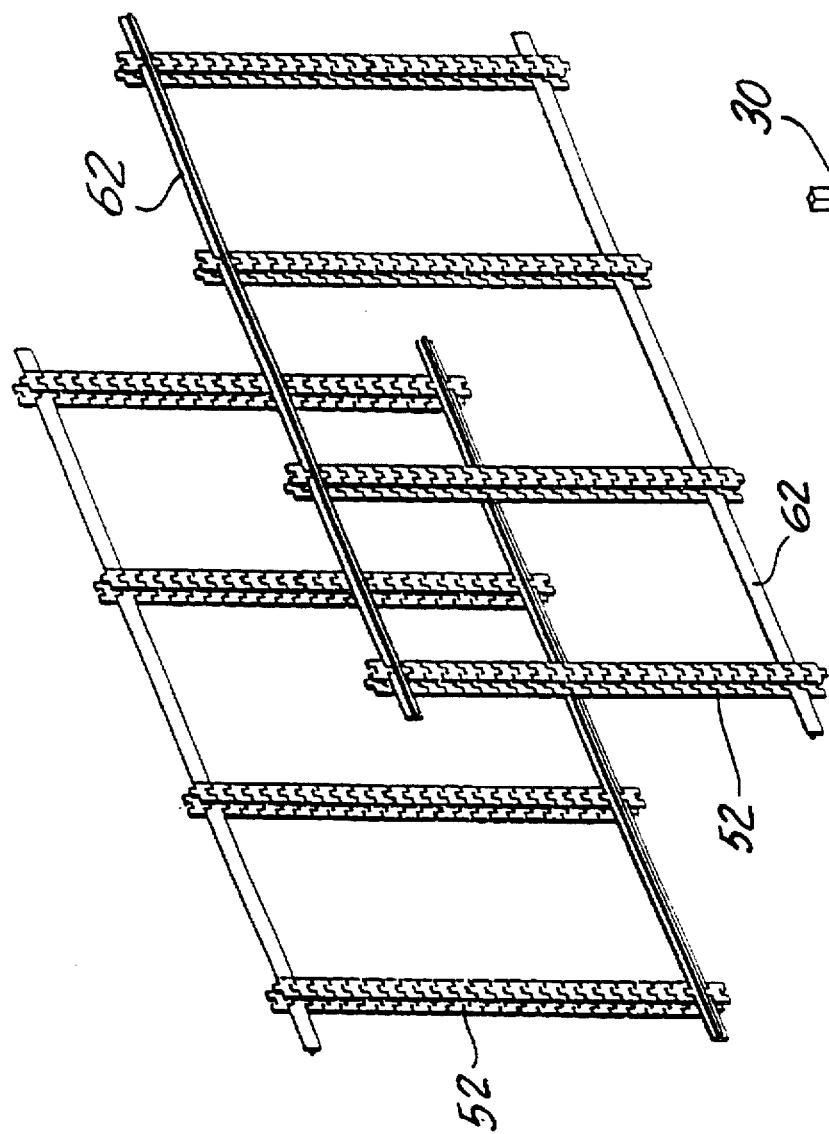

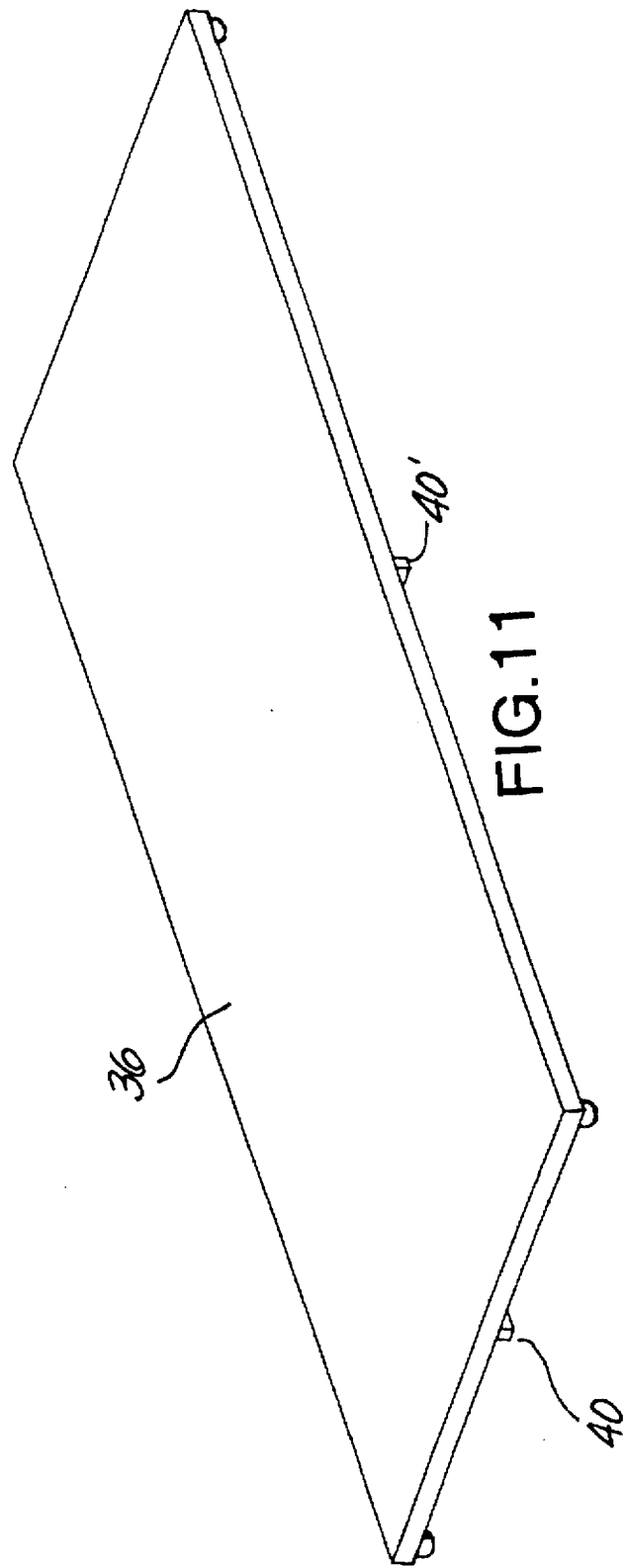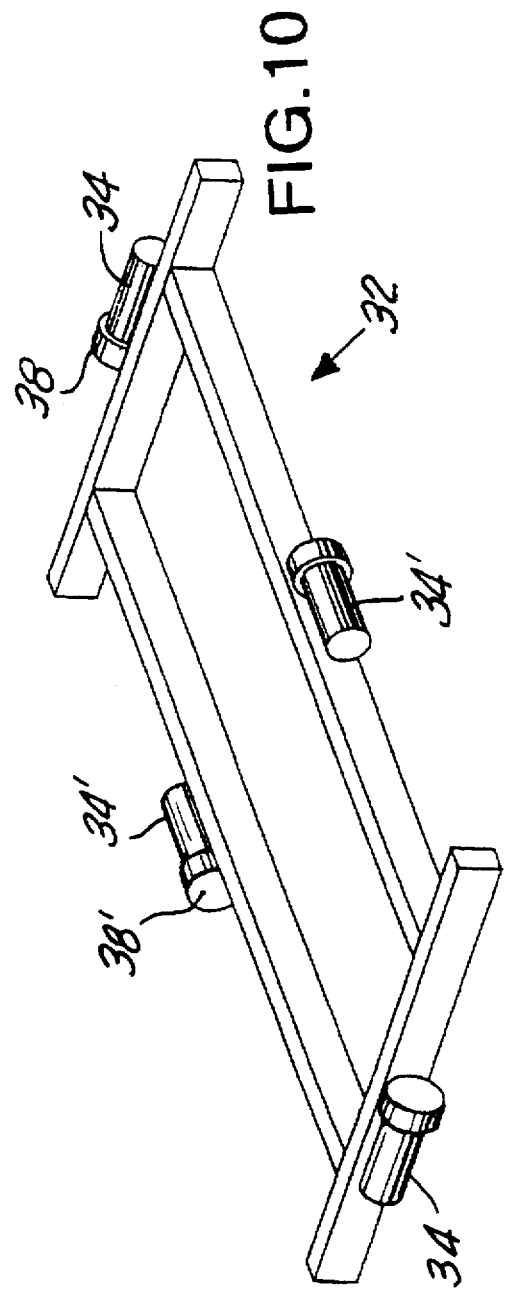

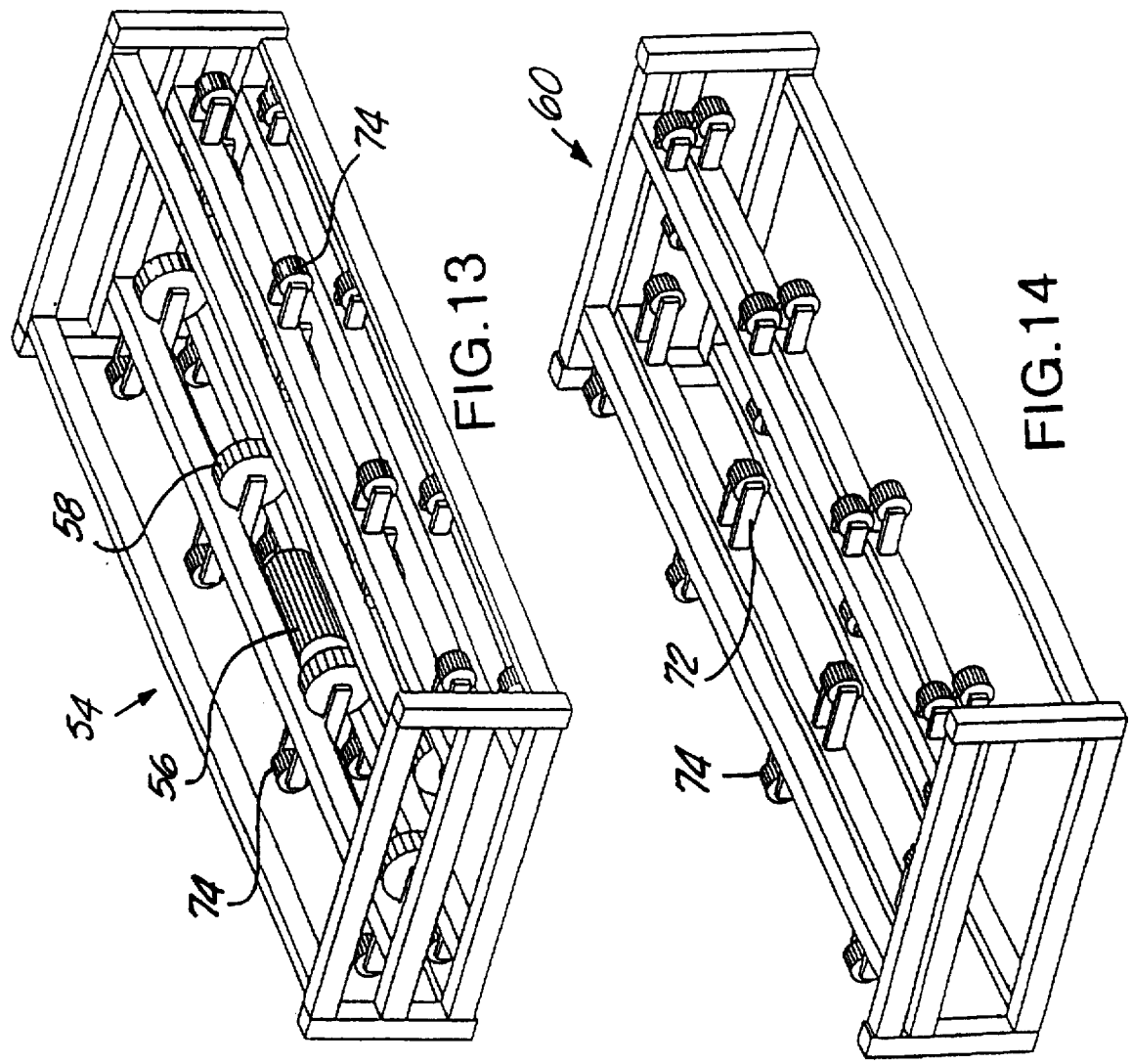

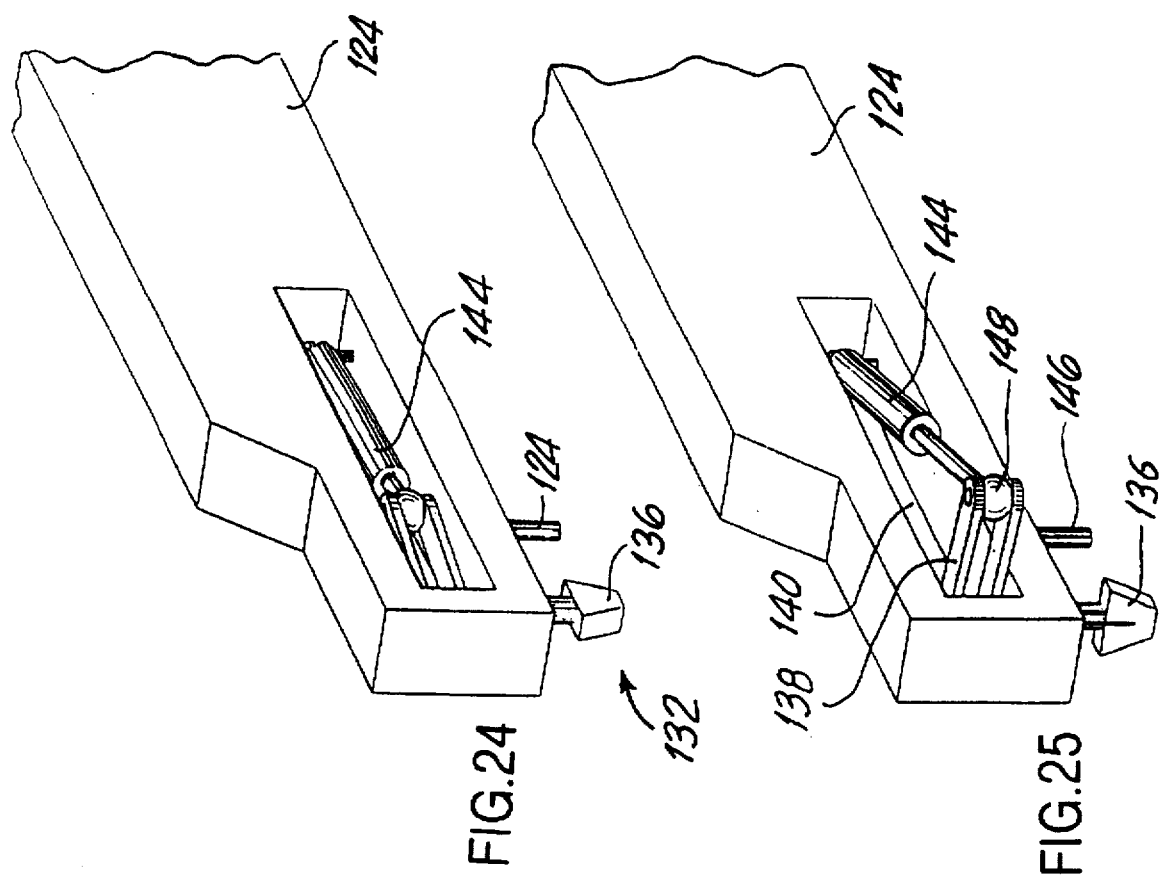

APPARATUS FOR STORING OBJECTS IN A STORAGE BLOCK

DESCRIPTION

The invention relates to an apparatus for storing objects in a storage block, having identical storage places arranged behind—or next to—or above one another in the X, Y and Z directions, and at least one elevating member, assigned to the storage block, each storage place being equipped with a driving unit for displacing the objects in the Y direction and driving units being provided for displacing the objects in the X direction between the entrance area and the outward-transfer side of the storage block.

Such storage systems are known, for example, as high-bay warehouses, in which storage places arranged next to and above one another are provided on both sides of an aisle, which has the advantage that each individual position permits direct access. However, only as many positions as there are aisles can be served simultaneously.

Also known are sliding rack systems, which have only a very small space requirement since only a single aisle is required for access, while the other rack units are compressed to form an inaccessible block. This has the disadvantage, however, that very great masses have to be moved, resulting in a very long access time.

Dynamic rack systems have in comparison a very high loading and removal frequency, since access is possible over the entire end face. However, only similar articles can be stored in the individual rack compartments. Direct access to particular positions is not possible, because storage takes place on the principle of "first in—first out" or "last in—last out".

The subject of German Offenlegungsschrift 3,212,822 is a parking apparatus for motor vehicles which are parked on pallets and accommodated in storage places. The storage places are arranged in only one vertical slice, in which they are combined next to one another and above one another in the Y and Z directions to form a block. In front of this block there is located a laterally displaceable elevating member, with the aid of which the vehicle required in each case on the pallet is removed or can be put in place.

An apparatus of the generic type described at the beginning is known from German Patent 3,823,728. This is a multistory car park having at least two levels. In the case of this parking system, the storage places are arranged next to one another in the Y direction and behind one another in the X direction without intermediate spaces, thereby forming rows following successively in the X direction (reference to there as lines z) and lines lying next to one another in the Y direction (referred to there as rows r). In order to ensure the function of the parking system, at least one maneuvering place must be kept free in each line. When filling the multistory car park, the vehicles are driven in in such a way that a concentration in the direction of the drive-out row takes place, so that when the multistory car park is full the last row is free from vehicles. This free row is consequently to permit maneuvering movements when vehicles which are not in the forwardmost row are to be retrieved.

The known multistory car park operates substantially on the first in—first out principle. If—as explained—preferably the last of the rows lying transversely with respect to the main driving-through direction is kept free, this principle results in frequent maneuvering movements, in particular if there are significantly more lines than rows.

German Patent 3,823,728 does not provide any information on what happens with the empty pallets. From the description of the system it can be concluded that, once they become free, they are put back again at the empty storage places. In addition to this, an elevating member (lifting mechanism) is provided in every line, both in the entrance area and on the outward-transfer side. Furthermore, every storage place must be equipped with a plurality of lifting devices in the form of hydraulic cylinders, in order alternatively to raise into the working position the driving units for displacing the objects in the Y direction or the driving units for displacing the objects in the X direction.

The invention is based on the object of specifying a storage system which combines the advantages of the types of design explained at the beginning, without at the same time having to accept their disadvantages. In other words, the aim is to provide a storage system which allows a compact design and requires little space and also permits quick and direct access to the individual storage places with a minimum of maneuvering movements, without the remaining storage places being blocked during putting into place or removal.

In the case of the apparatus of the type outlined at the beginning, this object is achieved according to the invention by each of the rows following one another in the X direction having at least one free storage place and one level of the storage block being designed as a storage and return level for empty pallets.

Due to the fact that, in contrast to the prior art, the free storage places do not in each case lie in one line running in the passing-through direction, but that each row running transversely thereto has a free storage place which remains free for evasive and re-maneuvering operations, the absolutely necessary maneuvering movements are limited to a minimum; re-maneuvering of the vehicles remaining in each row relative to one another is dispensed with completely. Furthermore, the invention has the advantage that it is not absolutely necessary to provide a lifting mechanism in every line of the storage block; rather, it would suffice to equip for example only every second line with an elevating member.

A major advantage over the prior art is achieved furthermore by the fact that the empty pallets can be stored on the intermediate level of the storage block provided for them, without placing them in a place which has become free, and can be returned from the said intermediate level back into the system. On the intermediate level, the returned pallets can be cleaned without adversely affecting operation, for example after a certain number of uses or depending on the degree of soiling.

Last but not least, the invention has the further advantage that, thanks to the stipulation of providing a free storage place in every row, storage blocks which do not have a rectangular base outline, but for example a triangular base outline, can also be realized. In the case of a multistory car park according to German Patent 3,823,728, such a base outline would necessarily require that all free storage places be provided on the widest row.

The invention is suitable for various application purposes, in particular as a rack system, container store or multistory car park.

With the invention it is possible to arrange the storage places next to or behind one another without intermediate spaces and, in a further development, to arrange the elevating members on at least one outer side of the storage block. In addition, it is of course possible also to provide the elevating members inside the storage block if this is required in an individual case.

According to a preferred feature of the invention, the storage block is put together in a modular design from the storage places. This permits very rapid assembly in a way corresponding to the existing space available and the respective requirements, so that for example at trade fairs, public festivals or other large events a mobile multistory car park can be set up within the shortest time.

Assembly and stock-keeping are further simplified by the fact that each individual storage place is put together in a modular design from a basic element with a bottom frame and vertical column and also a displacing module. The displacing module in this case contains both the driving unit for the X direction and the driving unit for the Y direction and is generally fitted into the bottom frame.

In this case it is advantageous if each storage place has a bearer plate, which rests on the displacing module and can be displaced by the latter. This design is suitable in particular for use of the storage system as a multistory car park, so that the vehicles put in place stand on the bearer plates. The bearer plates may in this case be designed in such a way that they accept dripping water, it being possible then for a washing device to be provided in the lowermost region of the storage block.

It is particularly favorable if the displacing module has at least one driving unit for displacing the bearer plate in the X direction or in the Y direction, the driving unit being in engagement by a gear wheel with a toothed rack on the underside of the bearer plate. In this way, the lifting devices required in the prior art are superfluous, because the tooth engagements of the driving units not required are disengaged automatically by the respectively activated driving units.

Whenever the storage system serves for receiving containers, the driving units for displacing in the X direction are accommodated in the bottom frame of each individual storage place, while the driving units for the Y direction can act from above on the respective container.

In this case the procedure can be adopted that each storage place for receiving a container has a bottom frame which can be displaced in the Y direction by means of running rollers in guide rails. The bottom frame may be connected via drive spindles to the driving unit, for example an electric motor, which is fixedly installed in the storage block and brings about the displacement in the Y direction by one storage place in each case.

The driving units for displacing the containers in the X direction may be designed as so-called spreaders with a bearing frame, which can be moved by means of drivable running rollers in running rails and bears on its underside at least two vertically adjustable cross members with gripping elements (twist locks) for seizing the objects from above. Each level of the storage block has in each line such a spreader, which grips the desired container from above, raises it a little and moves it in the X direction between the entrance area and the outward-transfer side.

In this case it is favorable if the rectangular bearing frame bears in the region of its short outer side two cross members and in the central region two further cross members. In this way, the spreader can pick up either one long container or two short containers. For picking up containers of intermediate dimensions or oversized dimensions, further cross members may be provided.

The gripping elements are preferably designed as locking bolts which can be turned through 90° and are intended for engagement in receiving openings of the containers. The containers have for this purpose correspondingly designed corners (corner castings), which permit the establishing of a bayonet connection with the locking bolts.

Each locking bolt may be assigned a securing pin which can be moved in height and, when sitting on the upper side of the container or the like, for example on the corner castings, releases the turning movement of the locking bolt into its engaging position. Consequently, the faultless latching in of the twist locks and a raising of the container is ensured only after satisfactory locking.

In a further development of the invention, the elevating member has a frame which can be moved vertically in a shaft, serves as a lifting unit and has two mutually parallel running rails, into which or out of which the bearing frame of a spreader can run. The spreaders of the elevating members may in this way have the same design and the same dimensions as the spreaders which can be moved in the storage block (system spreaders).

The lifting unit can be moved in the elevator shaft by means of chain drives, spindles or hydraulic devices.

The bearing frames (system spreaders) may be equipped with a hydraulic-electronic weighing device, which can be connected to a central control. The container weights determined are passed on to a computer of the central control, where for example weight optimization can be performed during the loading of a ship.

According to a further feature of the invention, it is envisaged to accommodate in the storage block a movable fire-extinguishing container. This provides a mobile extinguishing unit which permits direct, semiautomatic fire fighting within the storage block. The extinguishing unit may be designed as a water or halon extinguishing system and allows the fighting of a fire inside a container with the aid of an extinguishing lance penetrating the latter.

In the case of the storage system according to the invention, the elevating members may also be put together in the vertical direction from shaft elements in a modular design. In this case it is favorable if each elevating member has at its upper end a driving unit for conveying chains and at its lower end a deflecting unit for these conveying chains.

In general it will be advantageous to assign to the elevating member a preparation place with lifting platform, in particular whenever the elevating members are provided on both end faces of the storage block. In this case it is appropriate to utilize the lowermost level of the storage block for the pallet return, in order for example in the case of a multistory car park to convey the no longer required pallets back from the drive-out side to the drive-in area. It is additionally possible to use the lowermost level as a pallet store.

It goes without saying that there is also the possibility of not constructing the individual stations in a modular system, but for example erecting them in welded or screwed constructions.

Figure 1:
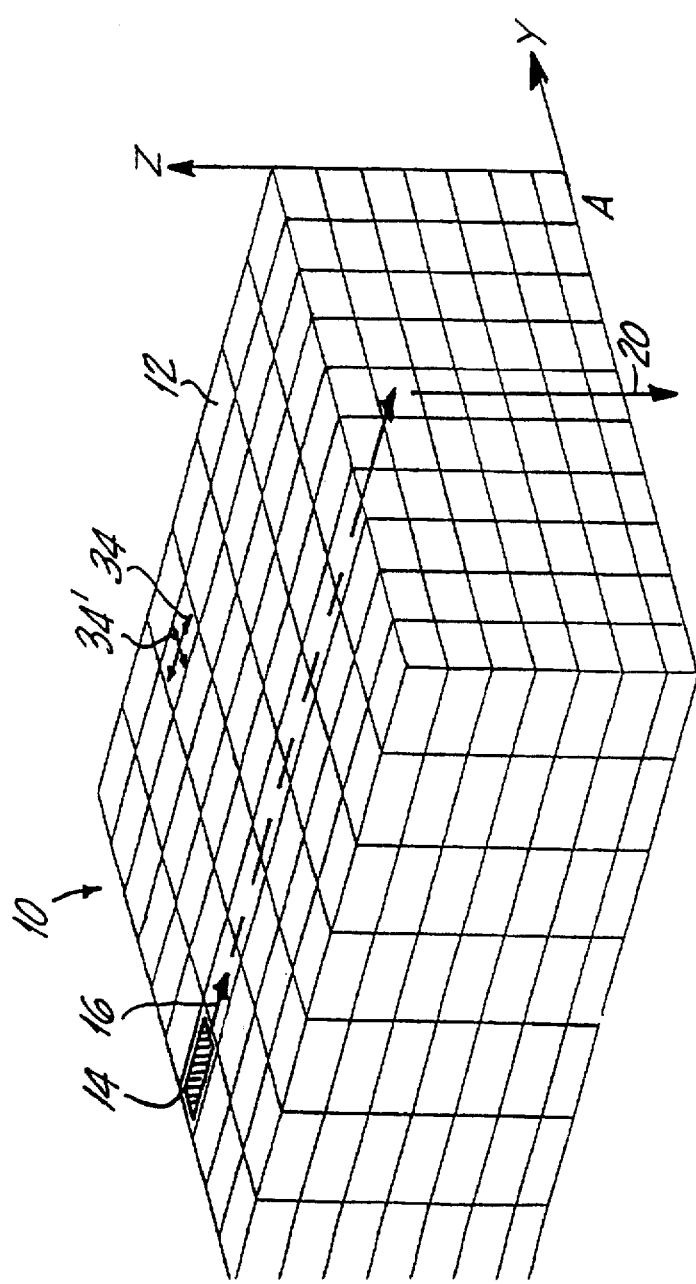
Figure 3:
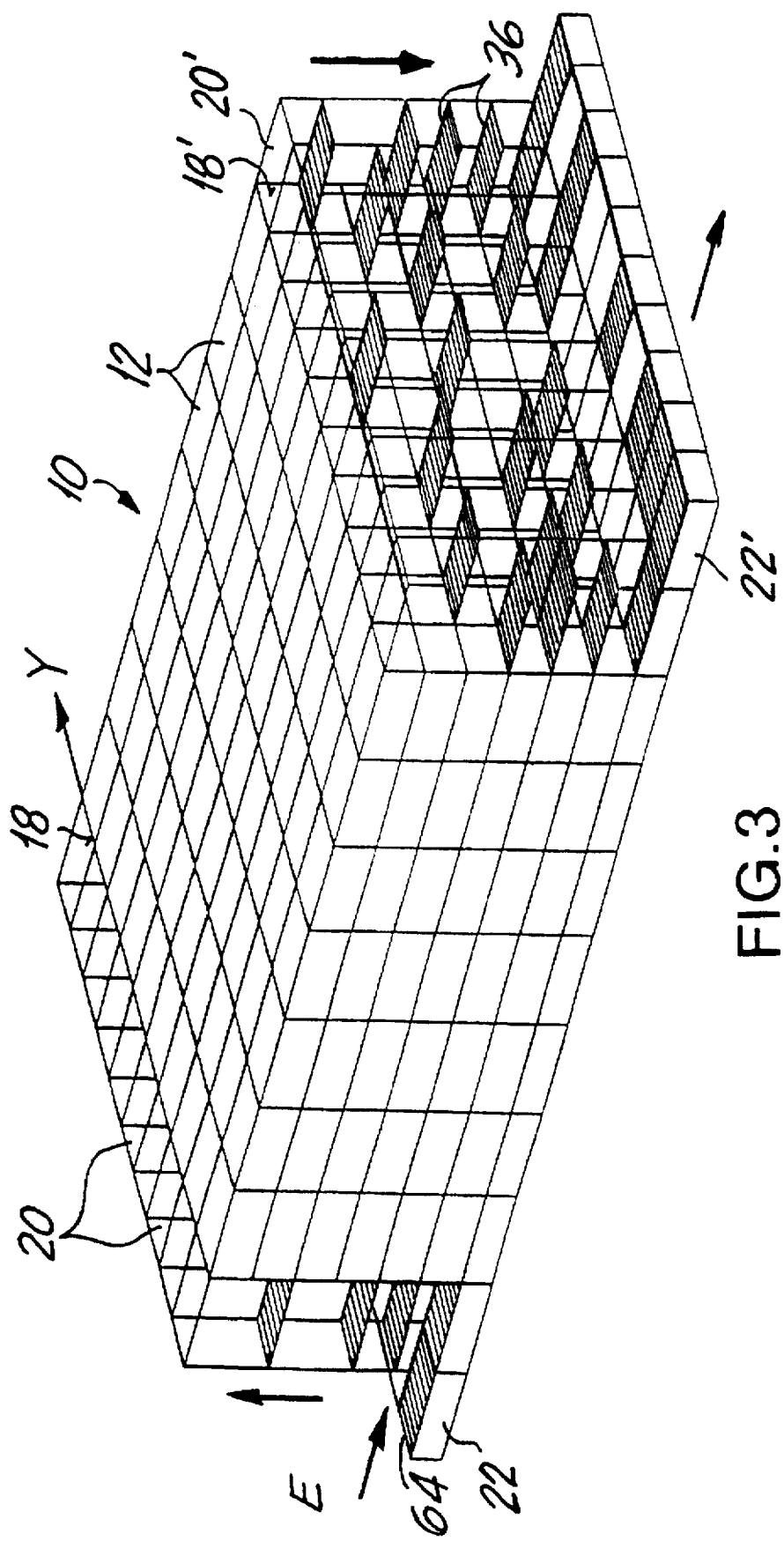
Figure 4:
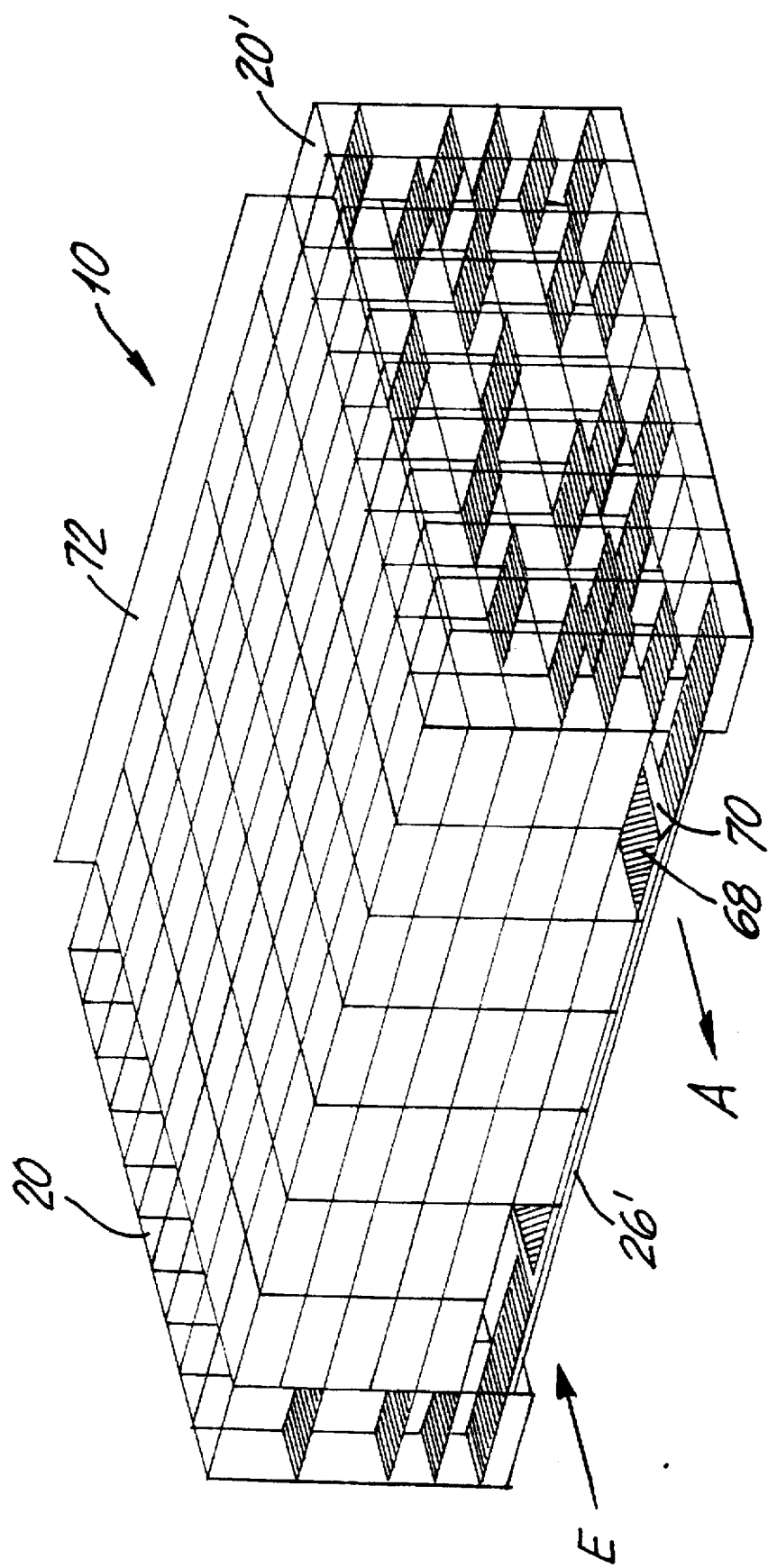
Figure 5:
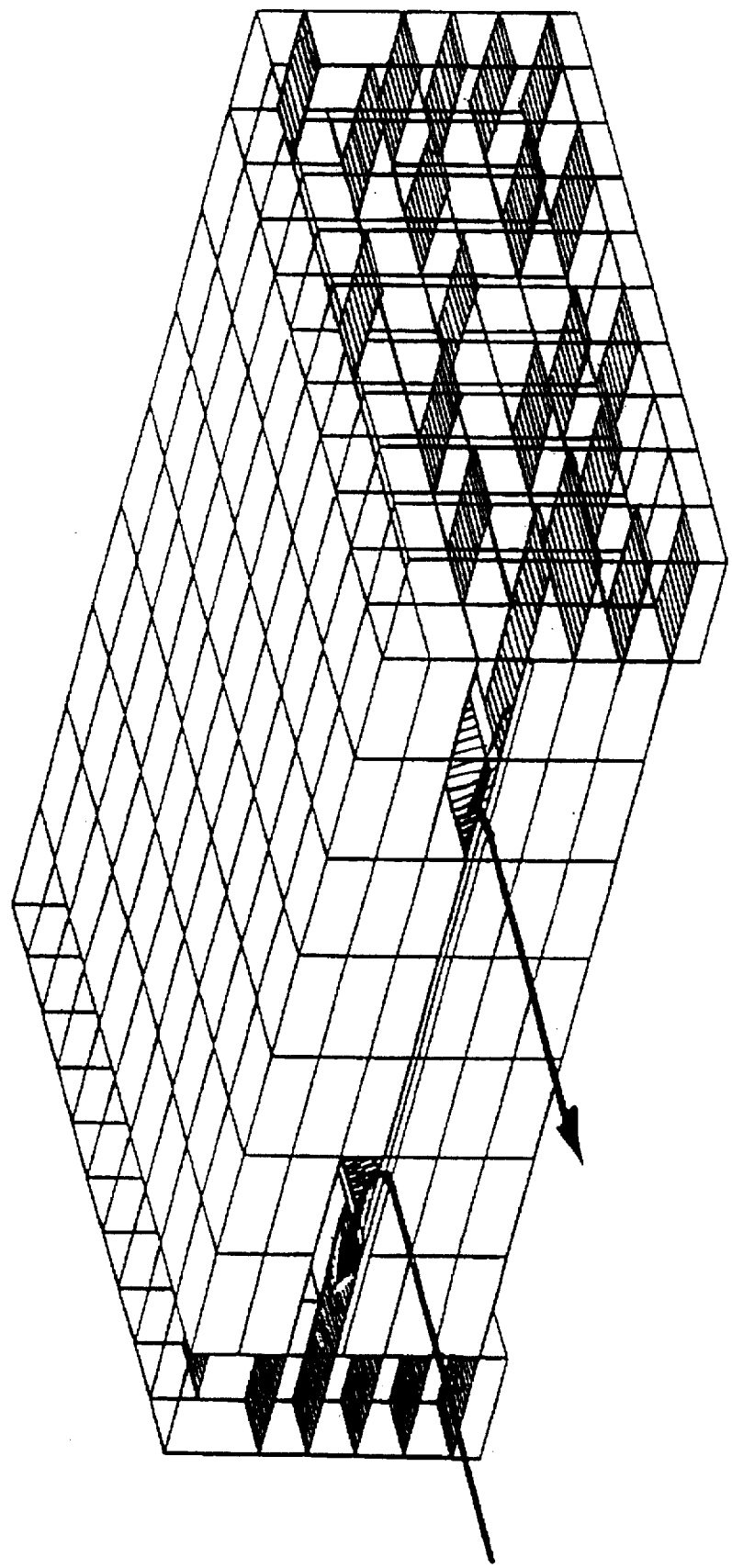
Figure 12:
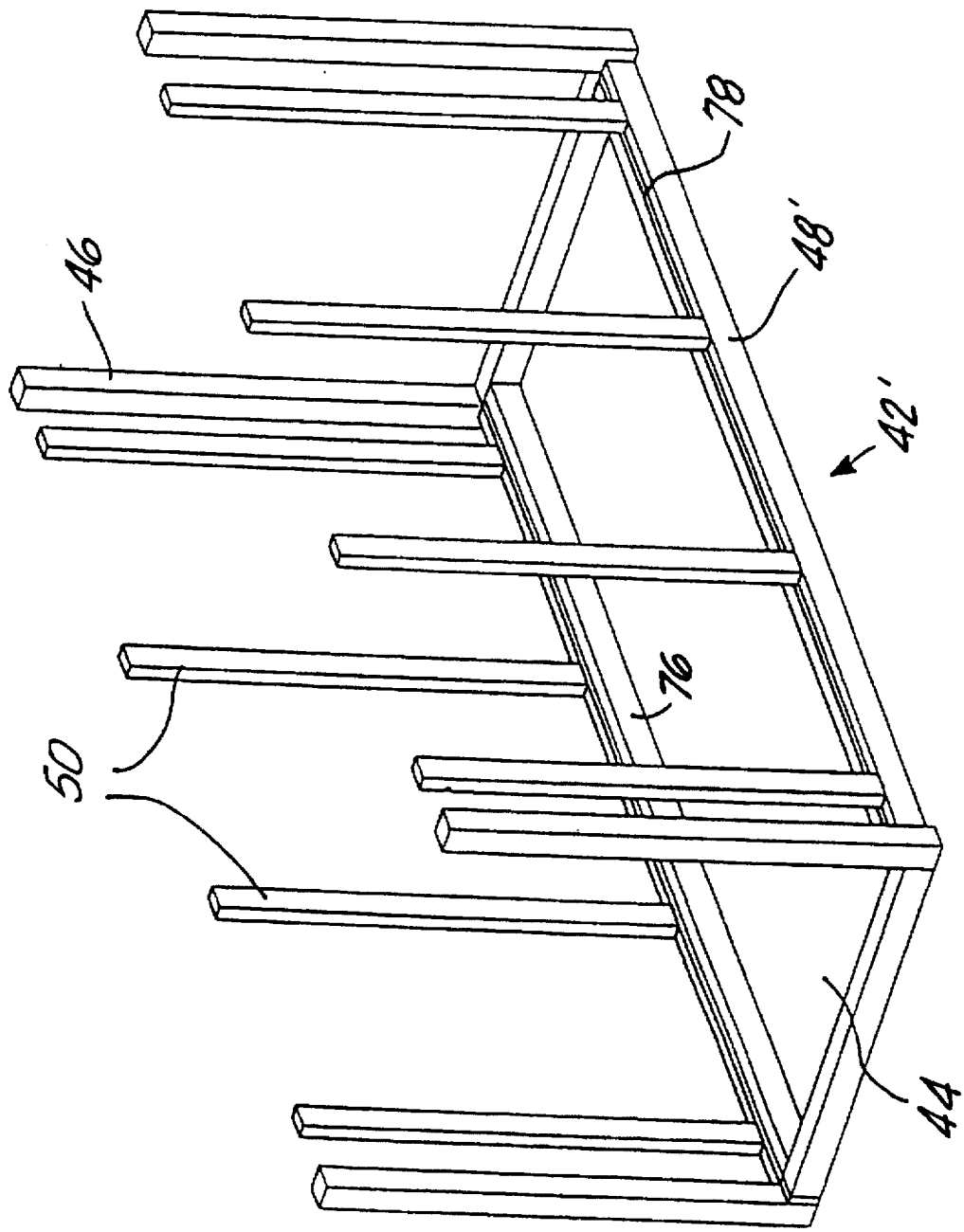
Figure 15:
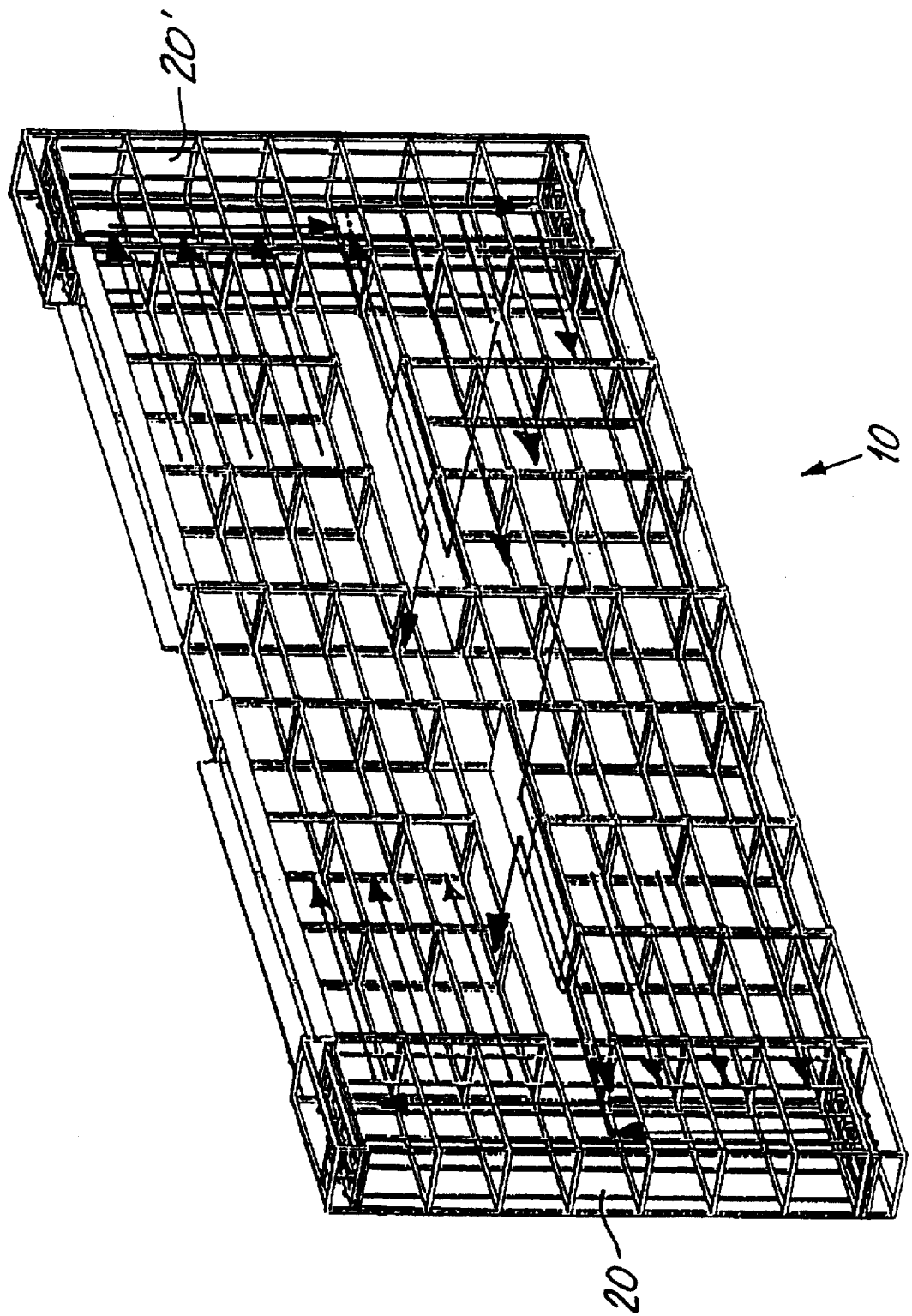
Figure 16:
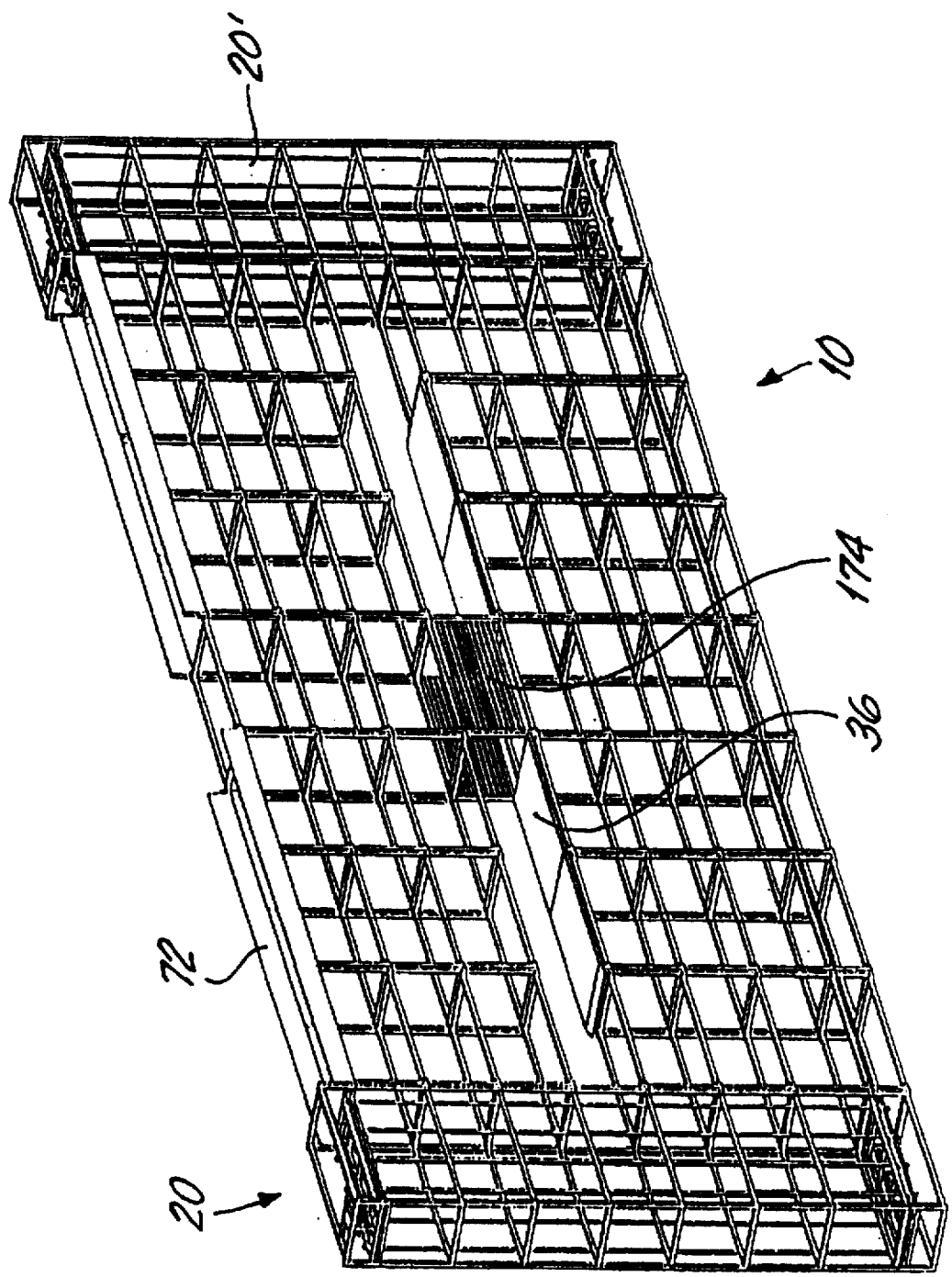
Figure 17:
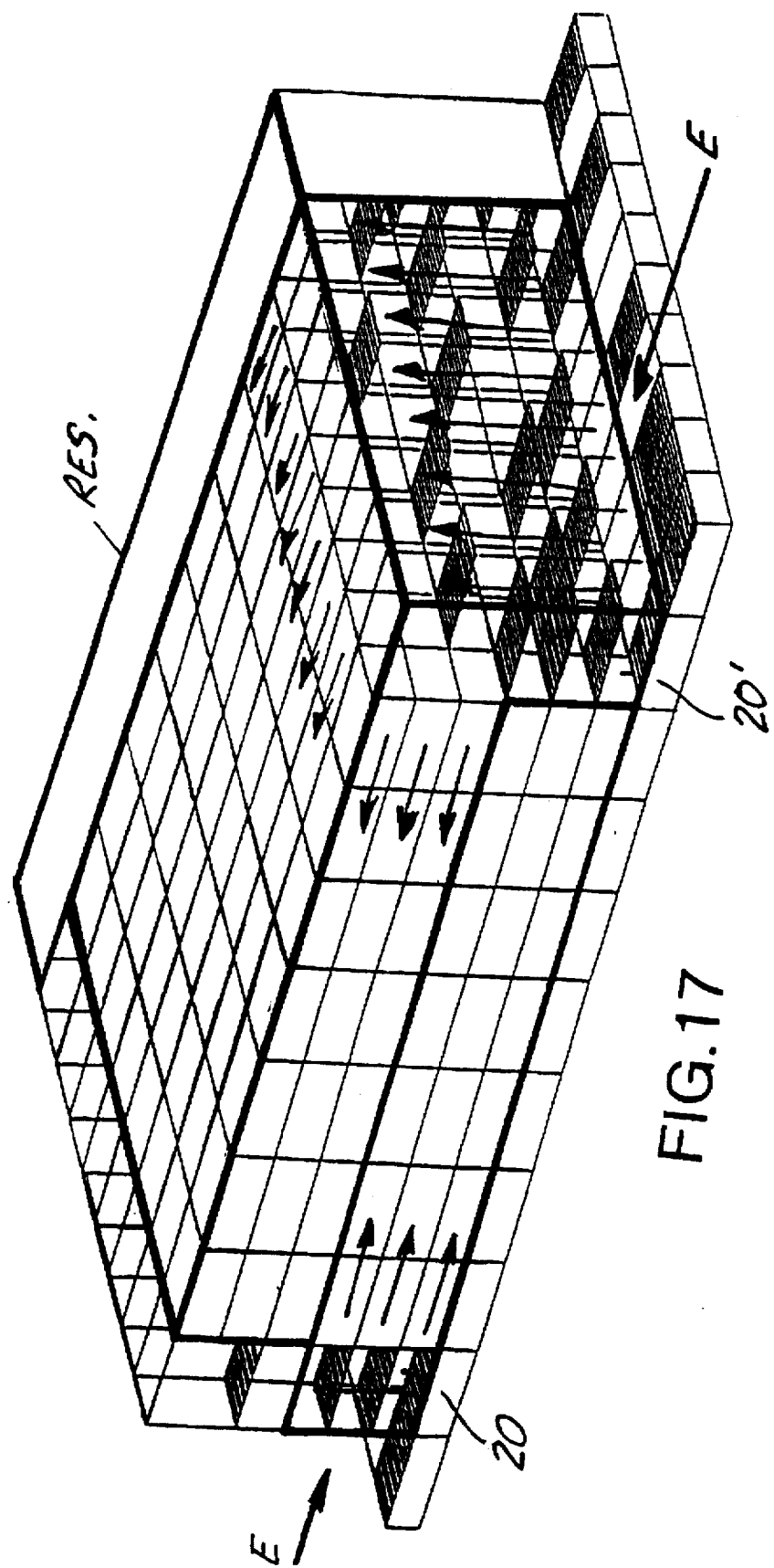
Figure 18:
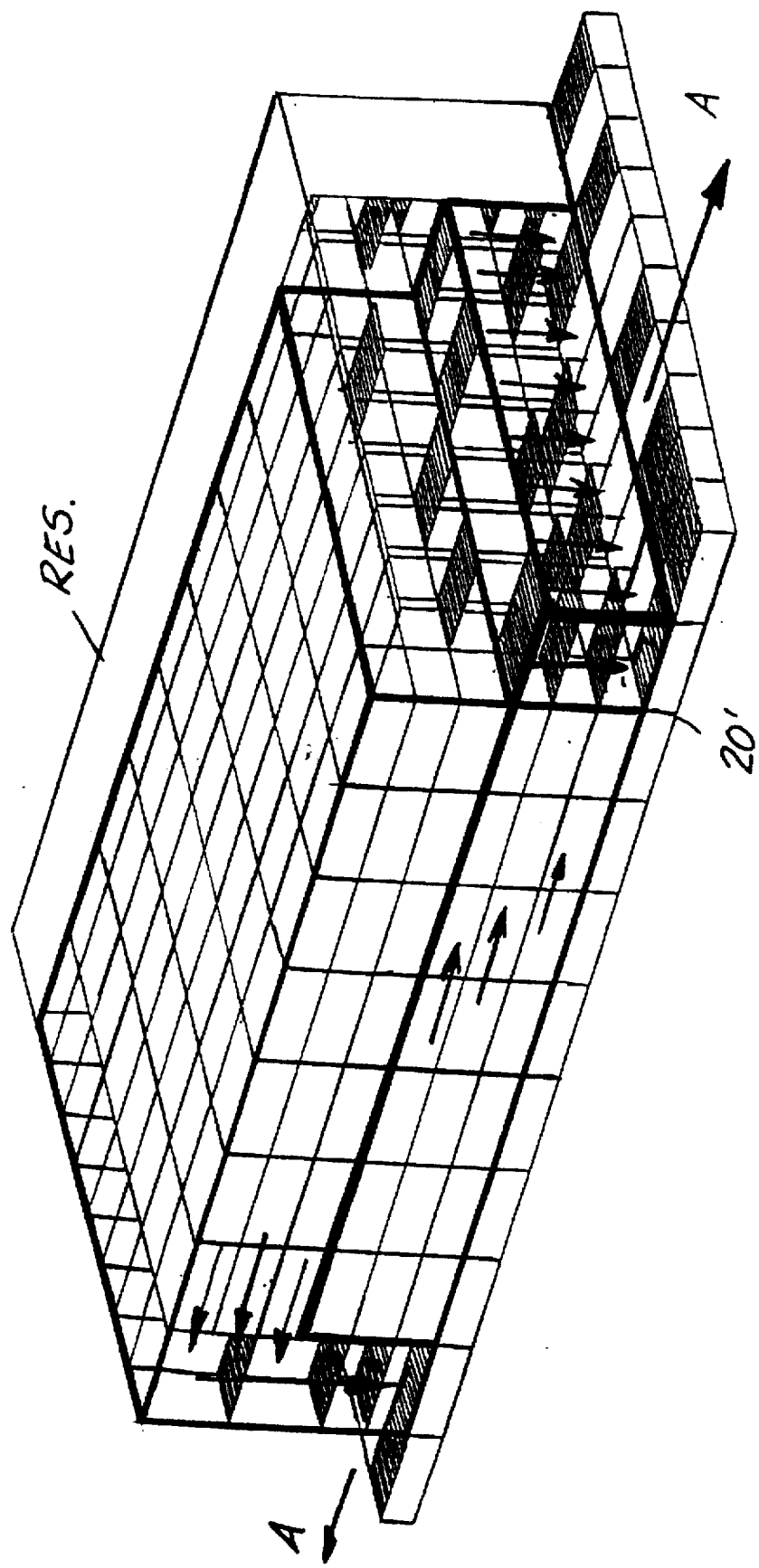
Figure 19:
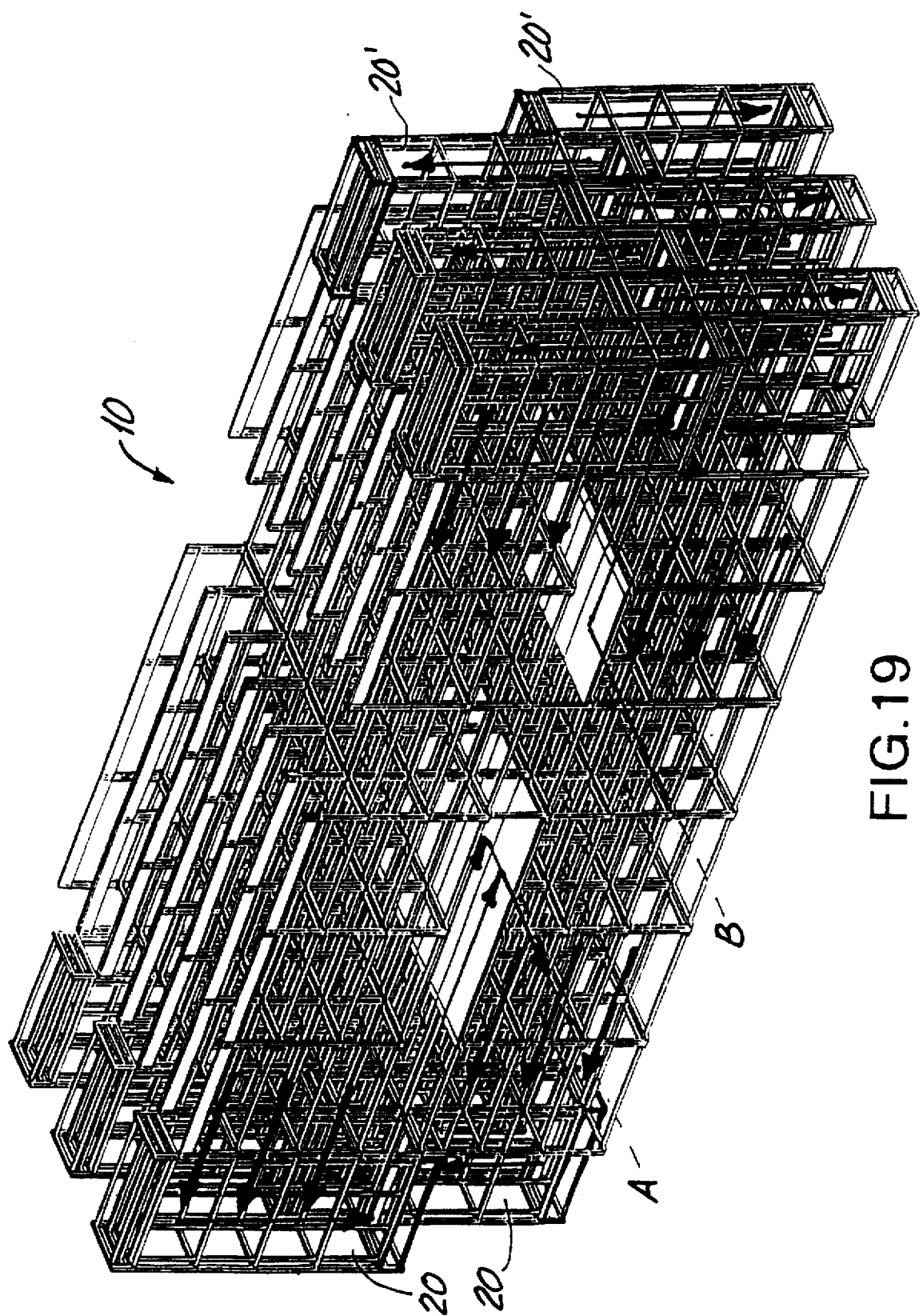
Figure 20:
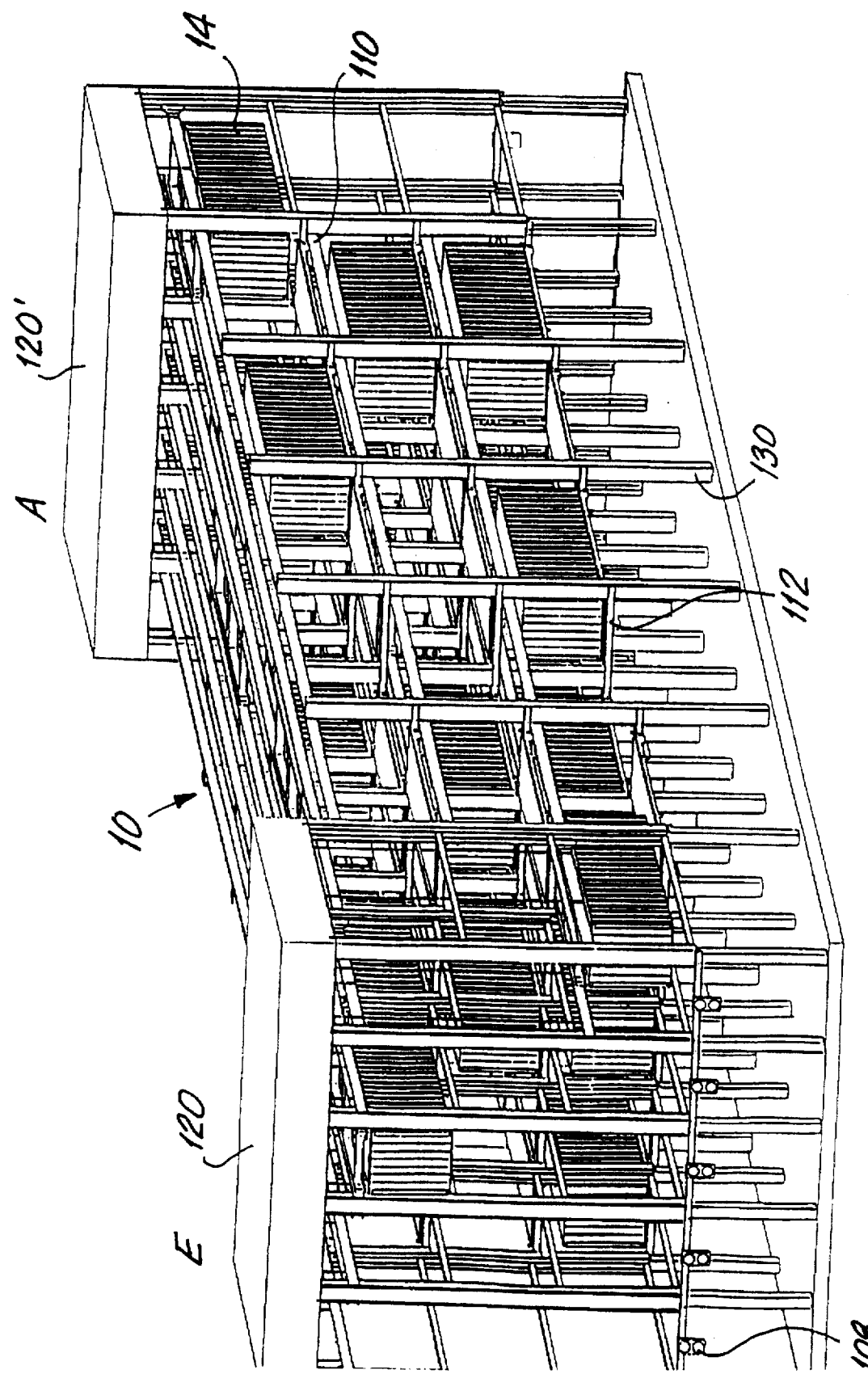
Figure 21:
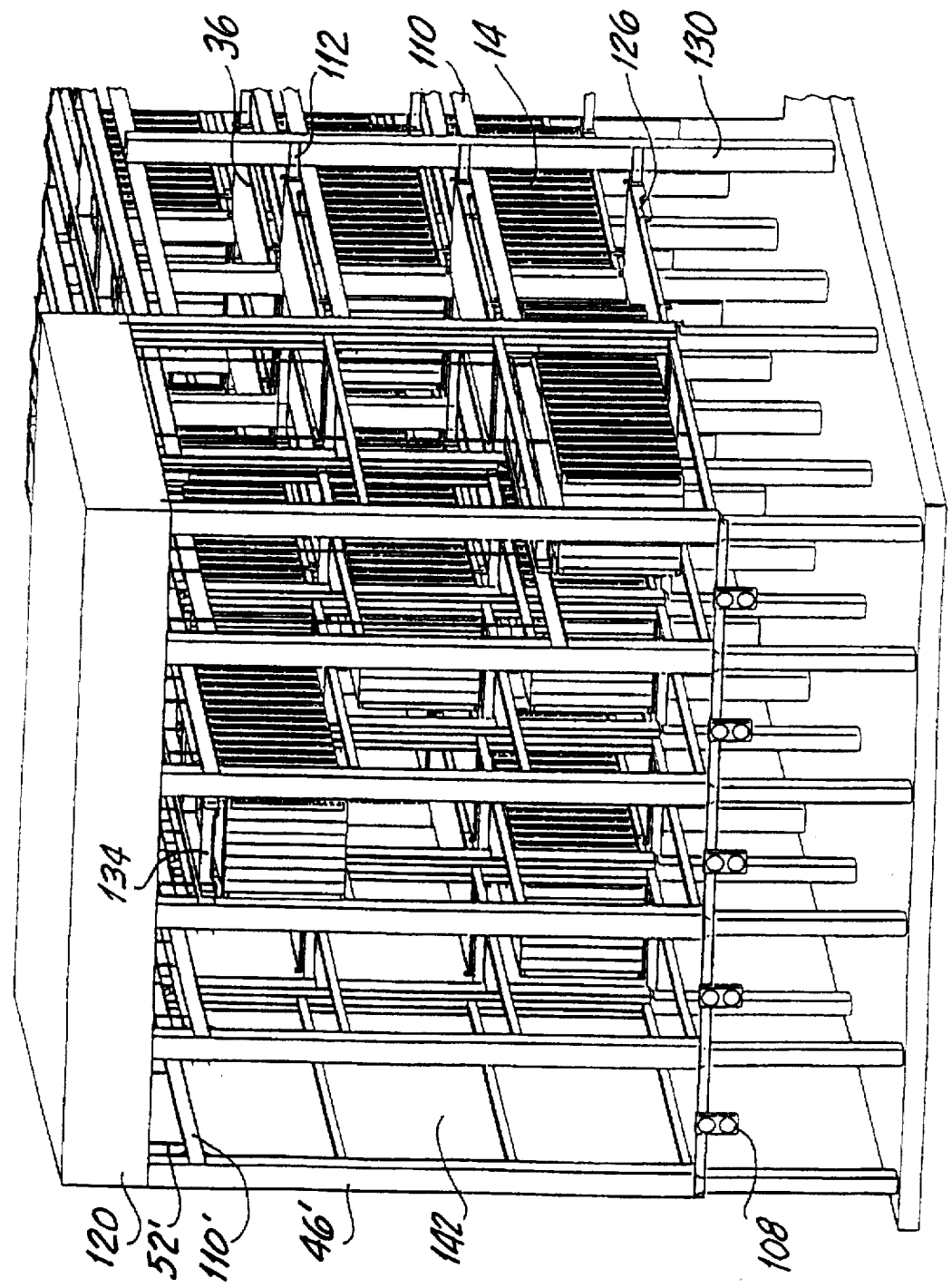
Figure 22:
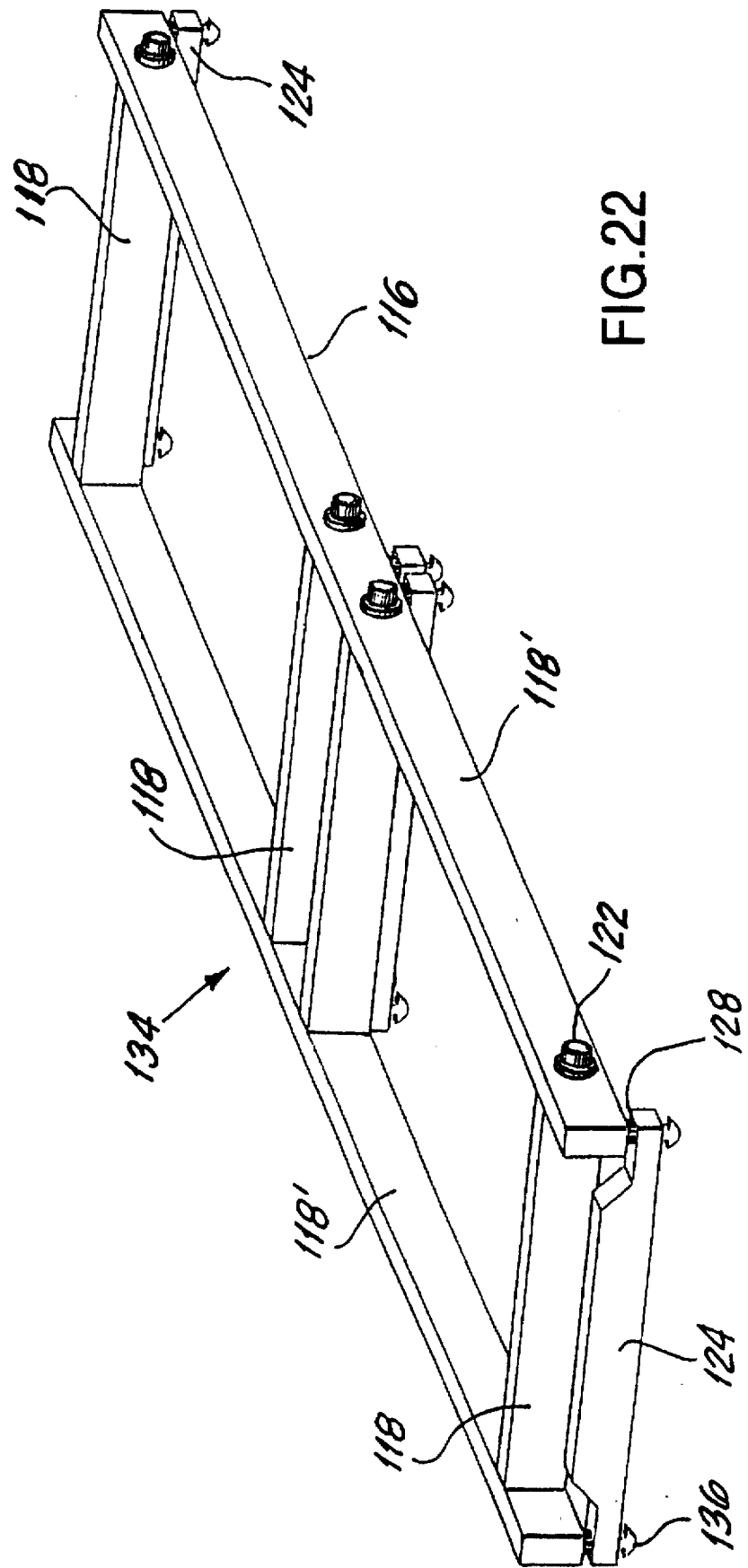
Figure 23:
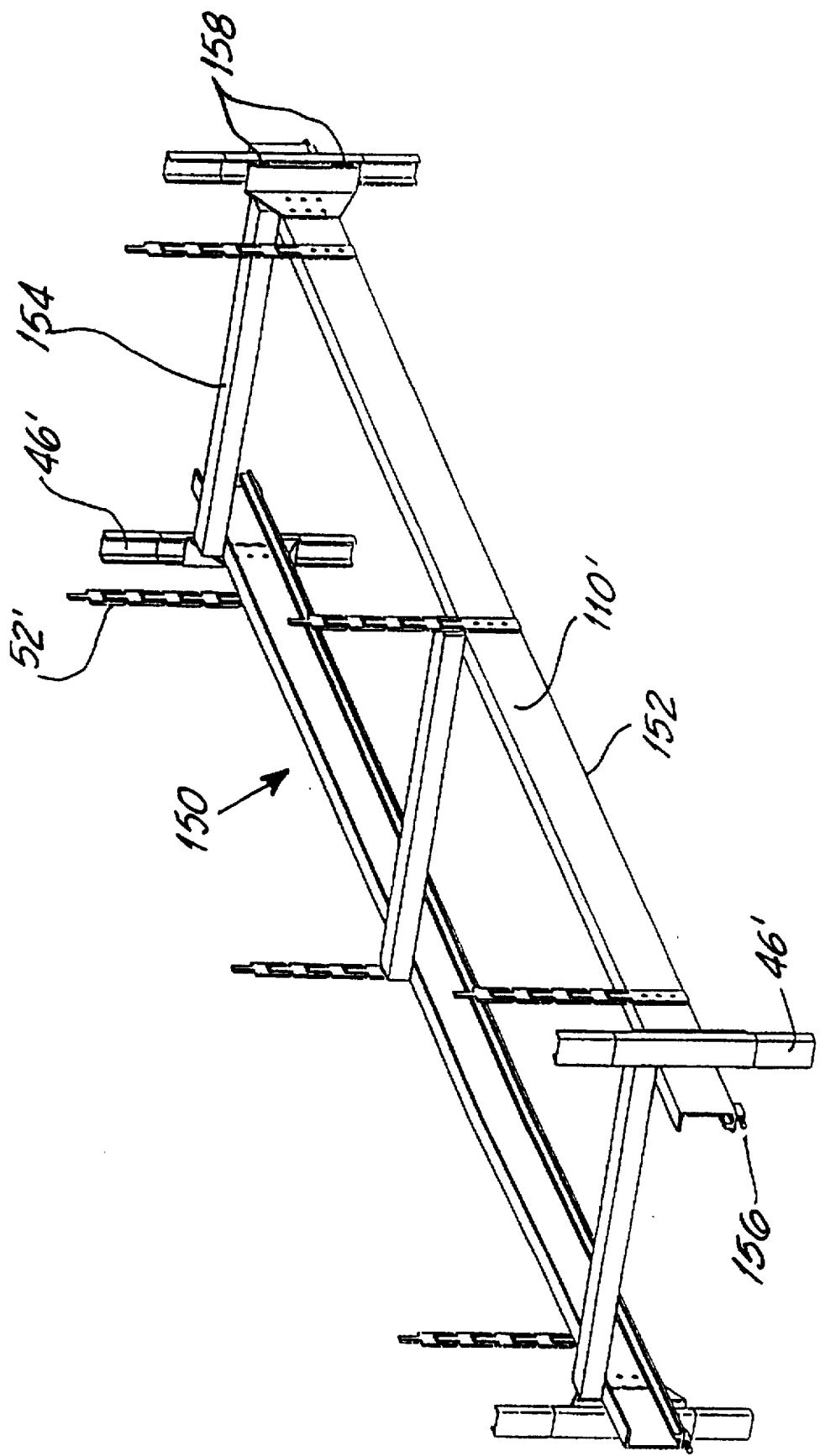
Figure 26:
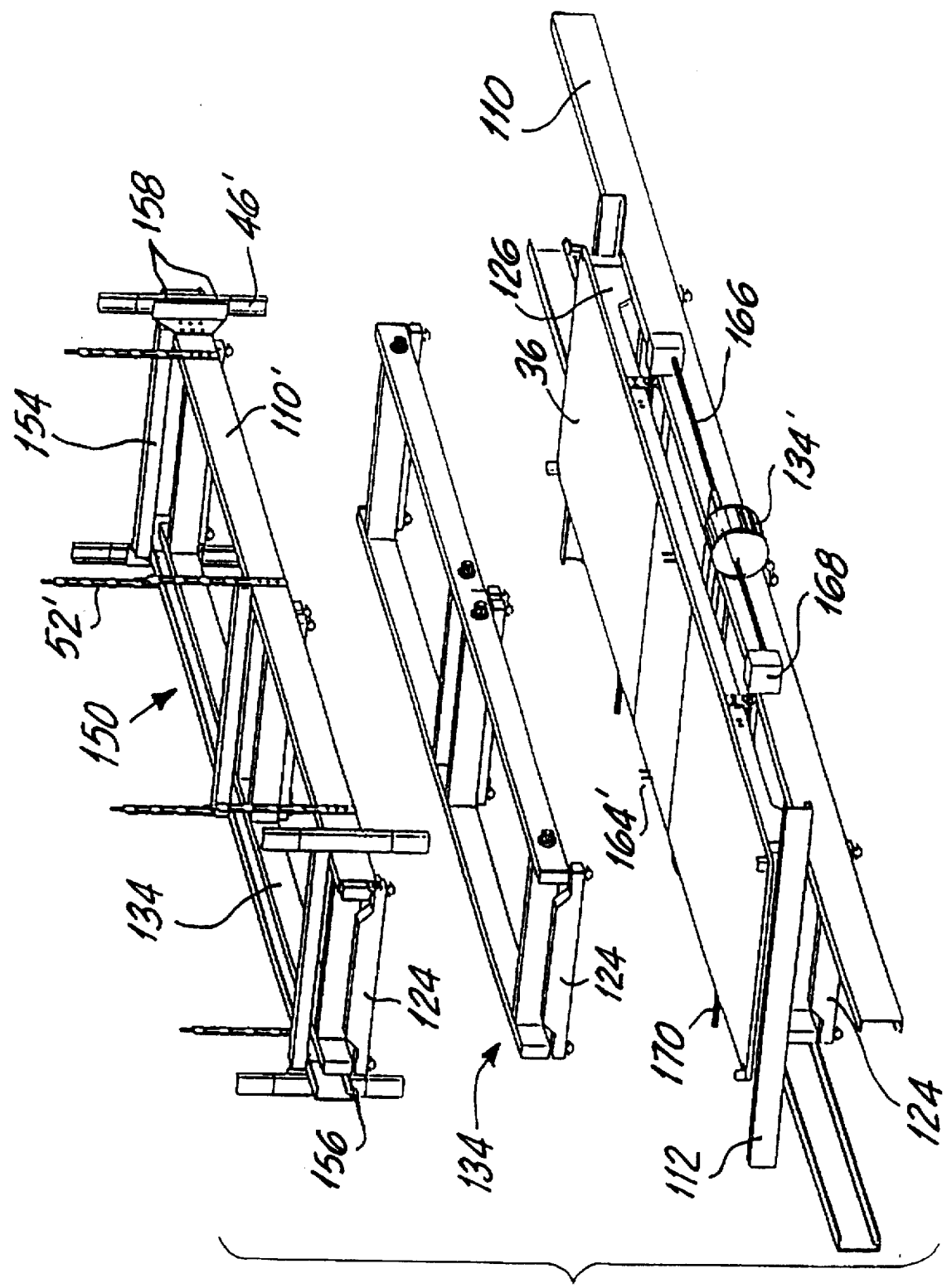
Figure 27:
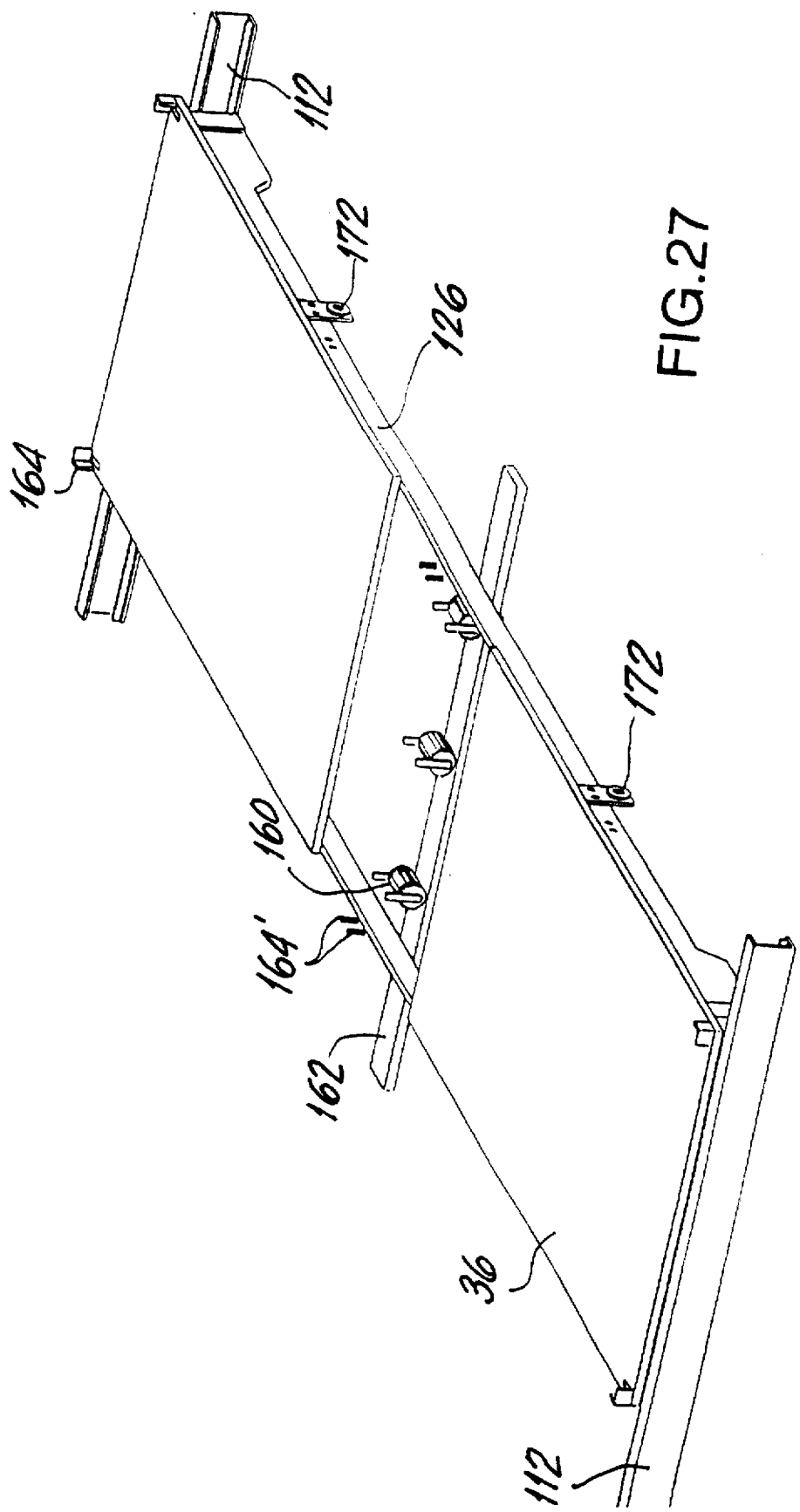
Figure 28:
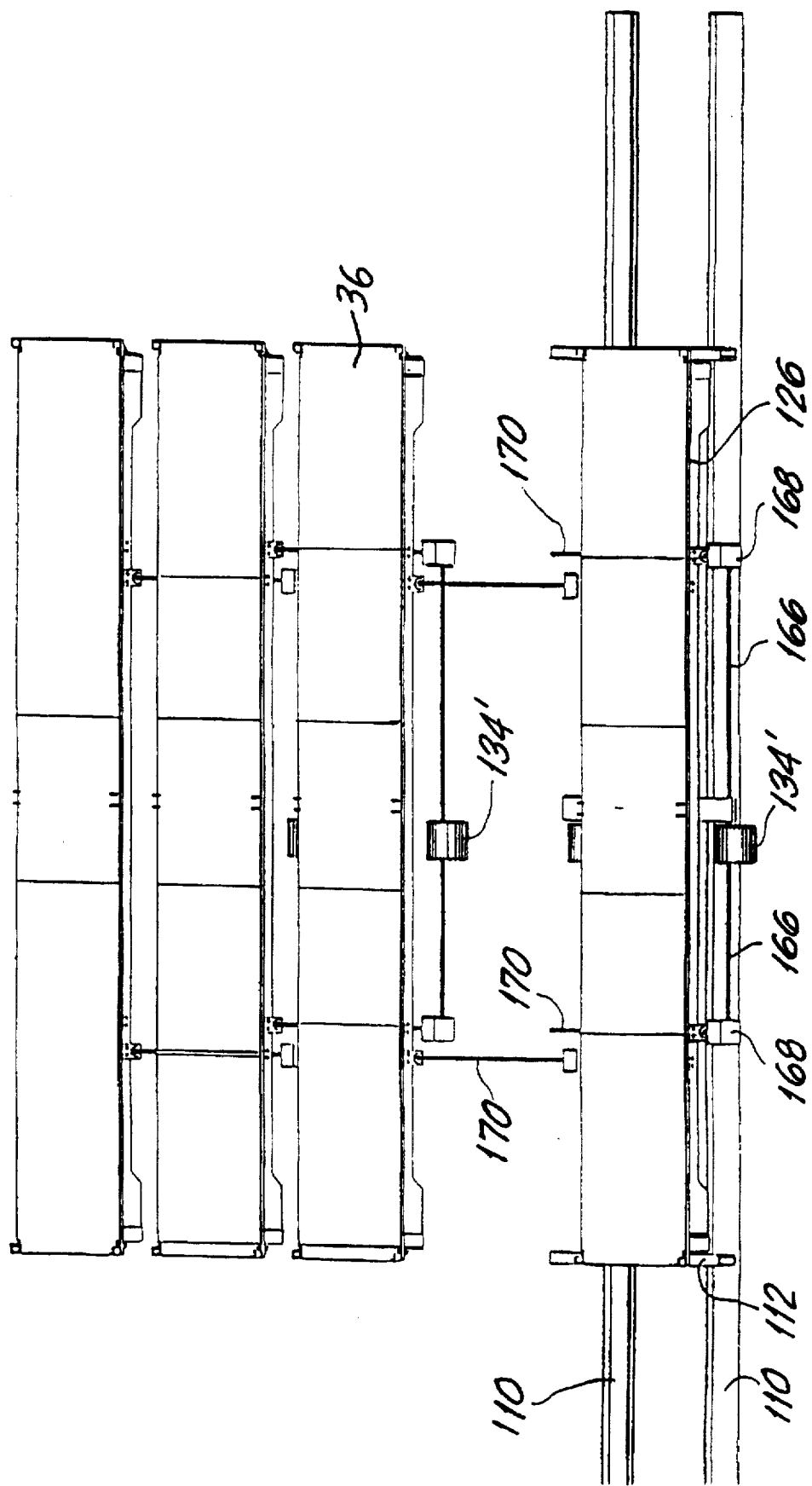
Figure 29:
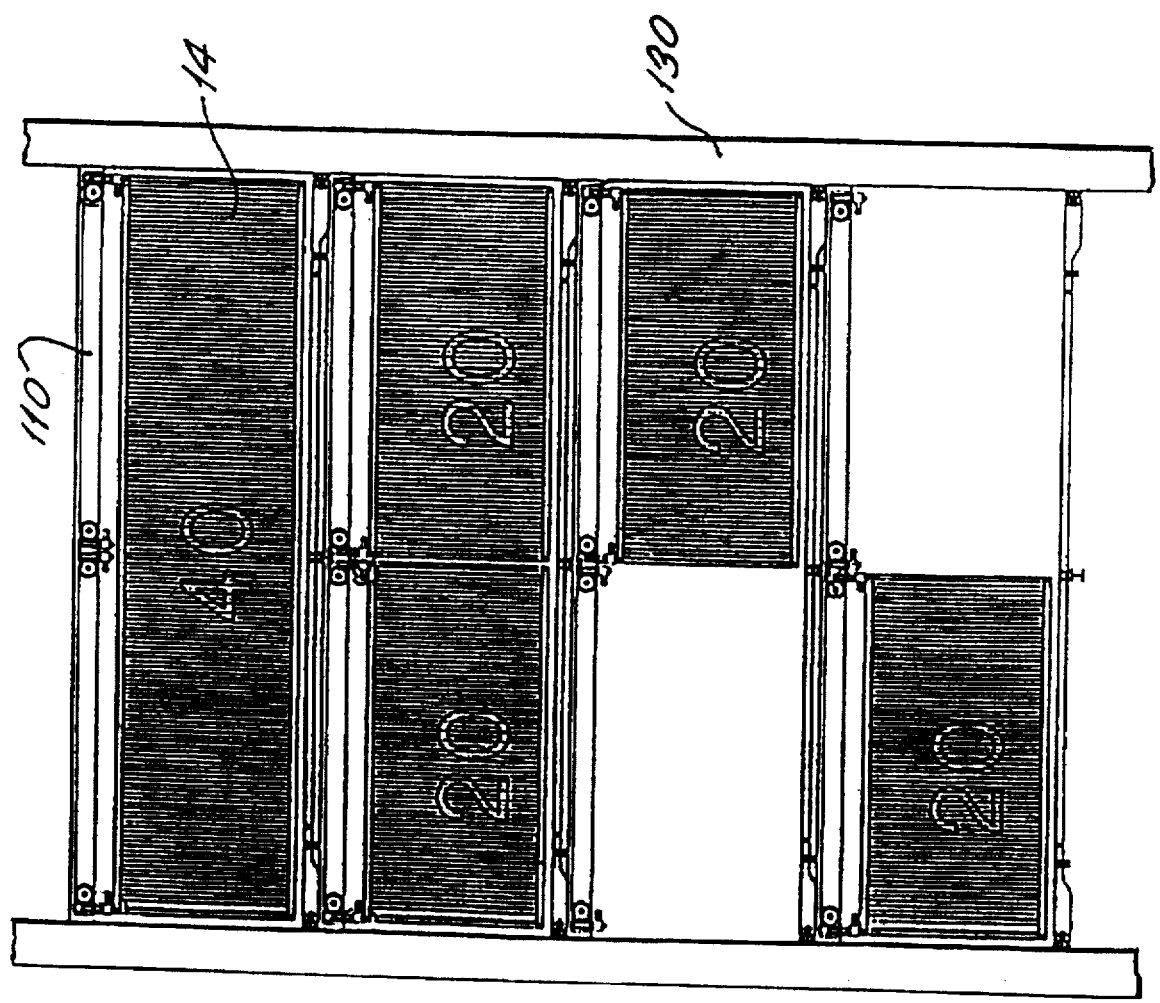
Figure 30:
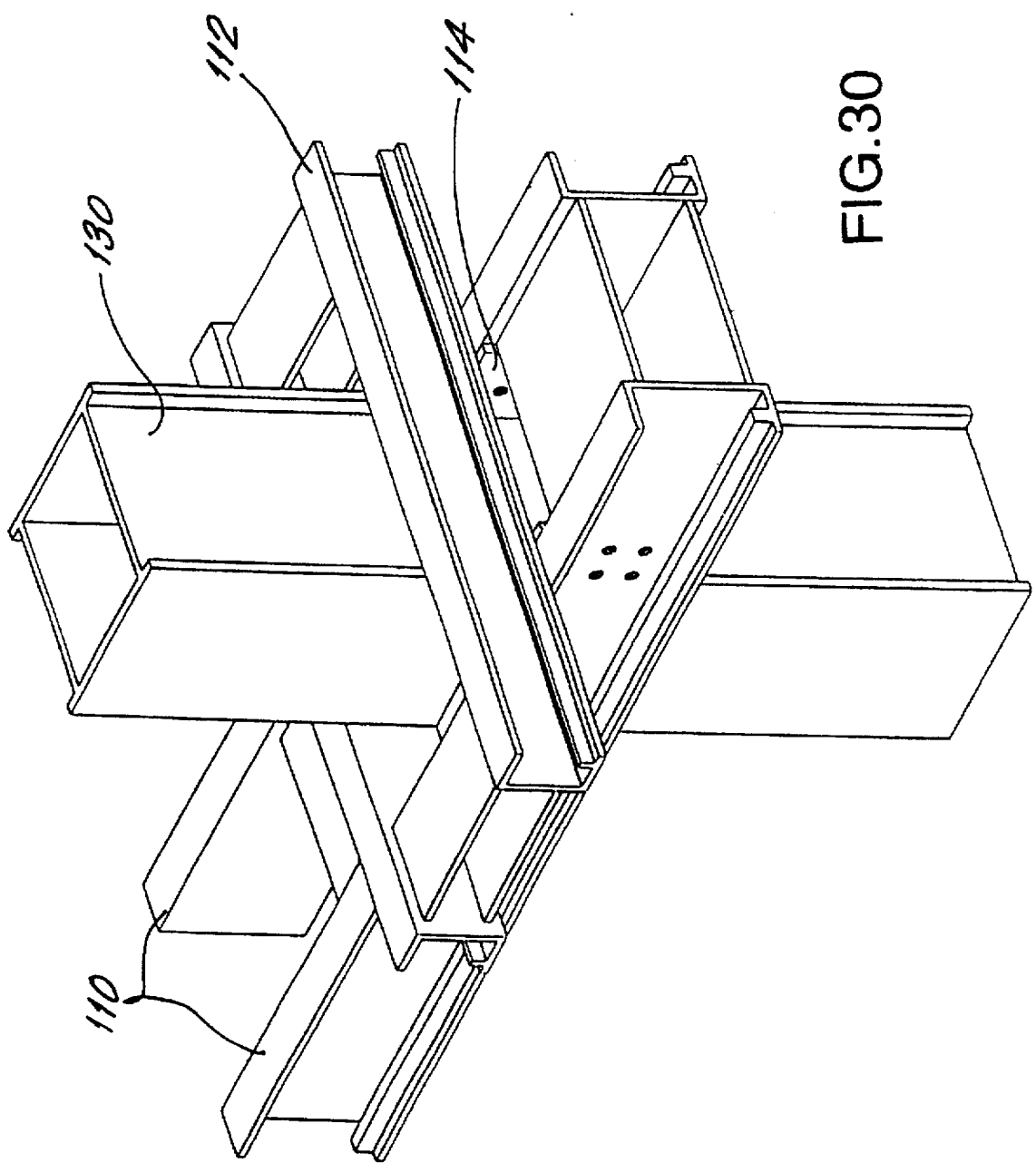
Figure 31:
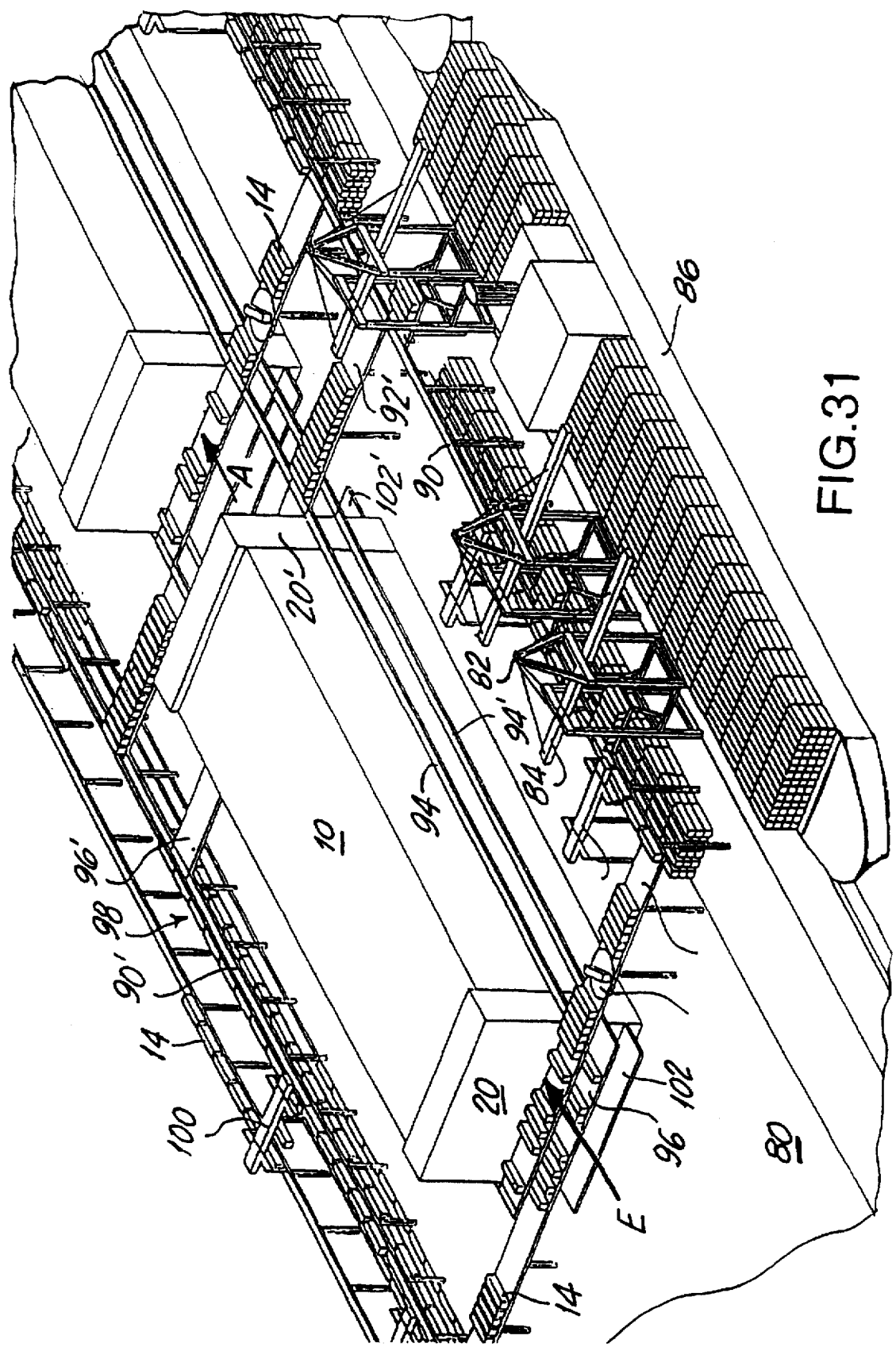

The invention is explained below with reference to exemplary embodiments which are represented in the drawing, in which:

FIG. 1 shows the diagrammatic view of a storage block of an apparatus according to the invention, FIG. 2 shows a diagrammatic plan view of the uppermost level of the storage block of FIG. 1, FIG. 3 shows the diagrammatic view of a multistory car park constructed on the principle according to the invention, with the drive-in on one end face and the drive-out on the other end face, FIG. 4 shows a variant of FIG. 3, in which access takes place from the longitudinal sides, FIG. 5 shows a further variant of FIG. 3, in which drive-in and drive-out take place on any intermediate level, FIG. 6 shows the perspective representation of a partial region of the variant shown in FIG. 3 in modular design, FIG. 7 shows an exploded representation of part of the modular elements used in FIG. 6, FIG. 8 shows an enlarged representation of a basic element with built-in displaying module, FIG. 9 shows an enlarged representation of part of a shaft element with conveying chains for an elevating member, FIG. 10 shows the view of a displacing module, FIG. 11 shows a bearer plate lying above the displacing module, FIG. 12 shows the enlarged view of a lowermost shaft element of the elevating member, FIG. 13 shows the perspective representation of a driving unit for an elevating member, FIG. 14 shows a deflecting unit of an elevating member, FIG. 15 shows a representation corresponding to FIG. 6 of the operating sequence in a multistory car park according to FIG. 5, FIG. 16 shows a variant of FIG. 15 with pallet buffer, FIG. 17 shows the multistory car park of FIG. 3 in another mode of operation, FIG. 18 shows a variant of FIG. 17, FIG. 19 shows a variant of FIG. 5 with alternatingly arranged elevating members, FIG. 20 shows a further variant of the invention in the form of a container store, FIG. 21 shows an enlarged view of the entrance area of the container store, FIG. 22 shows the view of a driving unit (spreader) for displacing containers in the X direction, FIG. 23 shows the view of a lifting unit in an elevating member, FIG. 24 shows the partial view of a cross member of a spreader in the unlocked position of the gripping element, FIG. 25 shows the partial view of the cross member in the locking position of the gripping element (twist lock), FIG. 26 shows the perspective representation of a lifting unit with spreader, a system spreader and a storage place with bottom frame for displacing the containers in the Y direction, FIG. 27 shows the view of the bottom frame of FIG. 26, FIG. 28 shows the plan view of a plurality of bottom frames with their driving units, FIG. 29 shows the view of a plurality of spreaders, arranged above one another, with containers suspended thereupon, FIG. 30 shows the view of a nodal point in the container, and FIG. 31 shows a container store in a port.

In FIG. 1 there is diagrammatically represented a storage block 10, which has for storing objects in a compact arrangement, for example containers, motor vehicles or receptacles, storage places 12 which are arranged behind or next to or above one another in the X, Y and Z directions without intermediate spaces. FIG. 2 shows the diagrammatic plan view of the storage block 10 of FIG. 1, it being assumed that the storage places 12 indicated by a cross are free, while all the other storage places are occupied. It was already pointed out at the beginning that it is advantageous not to occupy one storage place 12 in each row (X direction), in order to facilitate the storage and removal of objects 14.

If in the example of FIGS. 1 and 2 the object denoted by 14 is to be removed, which takes place in the X direction, i.e. from the rearmost row through to the forwardmost row, in each row there must only take place at most one displacement, in such a way that an aisle 16 is formed in the direction of the arrow drawn. In the exemplary embodiment the occupied storage places are displaced by the units listed below in the Y direction toward the unoccupied storage place (indicated by a circle):

row 2 one unit to the right
row 3 three units to the left
row 4 two units to the right
row 5 three units to the right
row 6 no displacement
row 7 two units to the left
row 8 five units to the left
row 9 one unit to the right.

These displacements in the Y direction can take place simultaneously, so that the cycle time until the object 14 located in the rearmost row can be pushed in the direction of the arrow through the now free aisle 16 for removal is very short. On the left end face 18 in FIG. 2 there then awaits an elevating member, which in FIG. 1 is indicated by the arrow 20. Here, the desired object 14 can be lowered downward and removed from the storage block 10.

As soon as the object 14 has been displaced by two rows, a further object can be removed from the row 1, since the objects which are in the way of the said object can be displaced onto the aisle 16 which has become free.

The storing of an object, for example a motor vehicle in a multistory car park, takes place in the reverse sequence, i.e. here too the occupied storage places are cleared in such a way that there can be formed an aisle 16, within which the object arrives at a free storage place.

In FIG. 3 there is represented a possible application in the form of a multistory car park, it being evident that the storage block is assigned on the left end face 18 as many elevating members 20 for driving in as the storage block 10 has lines (Y direction). In a corresponding way, the opposite end face 18' has in front of it elevating members 20' which serve for removal.

As FIG. 3 further shows, in front of the elevating members 20 of the entry side and behind the elevating members 20' of the exit side there is in each case a preparation place 22 and 22', respectively. This will be discussed in more detail in the following description of FIG. 6.

FIG. 6 shows in a cutout form one line of the multistory car park indicated in FIG. 3 of modular design. The individual elements can be seen in FIG. 7 in an exploded representation.

The central storage block 10 is made up, as already specified, of storage places 12, which are arranged next to one another or behind one another and also above one another without intermediate spaces. Each individual storage place 12 comprises a basic element, which in FIG. 7 is denoted by 24. This basic element 24 has a rectangular bottom frame 26, which comprises two short rails 28 and two long rails 28' and from the corners of which four vertical columns 30 protrude upward. As shown in FIGS. 7, 10 and 11, within the basic frame 26 there may be installed a displacing module 32 (FIG. 10), which has on its narrow sides two mutually opposite driving units 34, for example electric motors, which serve for the longitudinal displacement of a bearer plate 36 resting on them, which has on its underside corresponding engaging elements 40, for example toothed racks, interacting with gear wheels 38 of the driving units 34. At right angles to this displacing direction in the X direction, the bearer plate 36 may also be displaced in its transverse direction, i.e. in the Y direction, for which purpose the displacing module 32 has a driving unit 34' on each of its mutually opposite longitudinal sides. Of these driving units 34' as well there are gear wheels 38' in engagement with corresponding engaging elements 40', for example toothed racks, which are fitted on the underside of the bearer plate 36.

FIG. 8 shows a basic element 24', which is already equipped with the displacing module 32 and the bearer plate 36.

For reasons of a better overview, in FIG. 6 only the basic elements 24 for the individual storage places 12 are shown, while the displacing modules 32 and the bearer plates 36 are omitted. The front end face, in FIG. 6, of the storage block 10 has in front of it elevating members 20, of which in FIG. 6 only one is drawn in, since the remaining lines (Y direction) have been omitted or only indicated. A similarly designed elevating member 20' adjoins in the passing-through direction onto the rear end face of the bearing block 10.

Each elevating member 20 is made up in the vertical direction in a modular design from identical shaft elements 42, which in FIG. 7 can be seen in an exploded representation. Each shaft element 42 has a rectangular frame 44, from each of the four corners of which a column 46 protrudes upward. The length of the columns 46 corresponds to the length of the column 30 of the basic elements 28. The inside dimensions of the frame 44 are large enough that a bearer plate 36 can pass through upward and downward. From the longitudinal bearers 48' of the frame 44 there protrude upward—in the exemplary embodiment four in each case—cross-sectionally U-shaped guide rails 50, in which there run conveying chains 52, indicated in FIG. 9. For the driving of the conveying chains 52 there is built onto the upper end of the elevating member 20 a driving unit 54, which is represented in FIG. 13. This driving unit 54 is equipped with electric motors 56 and corresponding chain wheels 58, over which the conveying chains 52 are led. The conveying chains 52 run within the guide rails 50 downward to a deflecting unit 60, shown in FIG. 14, which terminates the elevating member 20 in the downward direction. This deflecting unit 60 is equipped with deflecting wheels 74 for the conveying chains 52 and with tensioning elements 72.

Between the penultimate shaft element 42 in the downward direction and the deflecting unit 60 there is a lowermost shaft element 42', shown in FIG. 12, which corresponds in its basic construction to the shaft elements 42. The difference is that a free passage for the bearer plates 36 is no longer possible here; rather, during the elevating movement, the latter are deposited downward within the lowermost shaft element 42' onto rails 76, which are located in front of the longitudinal bearers 48'. During the upward movement within the elevating member 20—or during the downward movement in the opposite elevating member 20'—the bearer plates 36, and with the latter possibly the objects 14 lying thereupon, rest on two mutually opposite longitudinal rails 62, which are fastened at uniform intervals on the chains 52 (FIG. 9). In the lowermost shaft element 42', the chains 52 and the longitudinal rails 62 pass through intermediate spaces 78, which are left free between the longitudinal members 48' and the rails 76.

In the case of the exemplary embodiment of FIGS. 3 and 6, each elevating member 20 or 20' has in front of it a preparation place 22 and 22', respectively, which has a lifting platform 64. The lifting platform 64 can be adjusted in the vertical direction by means of lifting elements 66, for example hydraulic cylinders or spindles.

In the case of the multistory car park system represented in FIGS. 3 and 6, the lowermost level of the storage block 10 serves furthermore for the return of the bearer plates 36 or as a buffer store for empty bearer plates. For this purpose, the lowermost level of the storage block 10 comprises basic elements 24", which according to FIG. 7 are lower than the basic elements 24 and correspond in their height to the deflecting units 60. Each basic element 24" receives a displacing module 32" which has to be equipped only with driving units 34 for the displacement in the X direction, but not with driving units 34' for the displacement in the Y direction. The same applies correspondingly to the deflecting unit 60, which likewise has in its bottom region such a displacing module 32".

In the exemplary embodiment of FIGS. 3 and 6 for a multistory car park, a motor vehicle to be parked drives in the X direction onto the lifting platform 64 of the preparation place 22, which lies in the drive-in area E in front of the elevating member 20. On the lifting platform 64 there lies an empty bearer plate 36. Driving in is possible in any desired line (in the Y direction). On the lifting platform 64 there is fitted a driving unit 34, which subsequently pushes the bearer plate 36, with the vehicle standing thereupon, in the X direction onto the deflecting unit 60, where the bearer plate 36 is taken up by the longitudinal rails 62 of the conveying chains 52 and conveyed upward in the Z direction. The elevating member 20 stops on a level on which a free storage place 12 is available, so that on this level the bearer plate 36 can be displaced by grippers (not shown) in the basic elements 24, which follow the elevating member 20 in the X direction, and subsequently can be displaced by the driving units 34 in the longitudinal direction and, if appropriate, by the driving units 34' in the transverse direction.

The removal of the vehicle then takes place in a corresponding way by means of the elevating member 20' and the preparation place 22' on the opposite end face of the storage block 10. There too, corresponding grippers for transfer into the elevating member 20' are provided in the last basic elements 24 lying in front of the elevating member 20'.

As soon as the vehicle has driven out again, the empty bearer plate 36 is lowered within the preparation place 22' by the lifting platform 64 and returned by means of the driving units 34 within the basic elements 24" of the lowermost level in the longitudinal direction back to the drive-in area E. Here, the empty bearer plate 36 arrives in the preparation place 22, the lifting platform 64 of which is lowered. As soon as the bearer plate 36 is lying on the lifting platform 64, the latter is raised to highway level, so that a further vehicle can drive in.

The said movements are controlled by a computer, which guides the bearer plates 36, with the vehicles standing thereupon, or the empty bearer plates 36 to the storage places 12 most favorably situated in each case. After driving in, the user receives a correspondingly coded card, so that he receives his vehicle again for driving out in the shortest time. In case the user loses the authorization card, in the entrance area there is provided a video camera, which records the license number of the vehicle and passes it on to a computer. Consequently, in an emergency, the user can also enter the license number at an input unit in order that the vehicle can be re-detected and retrieved via the computer. Other possibilities of identification according to the prior art may alternatively be used.

As already mentioned, the lowermost level of the storage block 10 or any desired intermediate level may also be utilized as a store or buffer for empty bearer plates 36. In this case, in each basic element 24" there are fitted a plurality of flat bottom frames 26', shown in FIG. 7, which correspond in their dimensions to the bottom frames 26 of the basic elements 24. Within each bottom frame 26' there is a displacing module 32" with two driving units 34 for the displacement in the X direction. Since a plurality of these flat bottom frames 26' are arranged above one another within the basic elements 24", the empty bearer plates 36 can be stacked within the respective level and retrieved when need be.

It goes without saying that it is also possible to fit within the bottom frames 26' displacing modules 32 which have in addition to the driving units 34 for the X direction also driving units 34' for the Y direction.

FIG. 4 shows a variant of a multistory car park designed according to the invention, in which the drive-in E and the drive-out A are not provided on the end faces in front of the elevating members 20 and 20' installed there, but on one longitudinal side within the storage block 10 on the lower level of the latter. No preparation places with lifting platform are required in this region, but there are fitted fixed bottom frames 26' (FIG. 7) with displacing modules 32, which bring the vehicles to the elevating members 20 or fetch them from the elevating members 20'. The drive-in and drive-out area is covered by highway plates 68, which are suspended a small distance above the bottom frames 26' and have partially sloping ramps 70 for transfer onto the bearer plates 36. The space between the drive-in E and the drive-out A may be used for a wide variety of purposes, for example for a pay desk area, the control, a pallet stacking means or vending stores. Since this area is not supported underneath, at the upper end of the storage block 10 there are fitted longitudinal booms 72, which are indicated in FIGS. 4 and 7 and absorb the vertical forces.

The variant of FIG. 5 differs from the exemplary embodiment of FIG. 4 in that the drive-in and drive-out area does not lie on the lower level, but on an intermediate level, while the levels lying underneath are underground.

FIG. 15 shows the main directions of movement of the vehicles in the case of a multistory car park, in which, according to FIG. 5, the drive-in and drive-out area is provided on an intermediate level.

FIG. 16 shows the possibility of providing a buffer place 174 for bearer plates 36 on any intermediate level of the storage block 10.

A variant of the multistory car park of FIG. 3 is indicated in FIG. 17. This variant serves for controlling the elevating members 20, 20' according to needs, in order to allow for peak operation. It was explained with reference to the example of FIG. 3 that the elevating members 20 operate only upward (drive-in area) and the elevating members 20' operate only downward (drive-out area). In the case of the example of FIG. 17, if need be the directions of movement may be reversed, so that also at least some of the elevating members 20' in the drive-out area are controlled upward, at least at certain times, in order to achieve an increased parking frequency in peak operation. A partial region of the multistory car park—here the rearmost lines, denoted by RES—can be operated in the standard mode, as was explained in the case of FIG. 3, in order to reserve this area for long-stay parkers.

FIG. 18 shows a further possibility of variation, in which the drive-out frequency at peak times is increased.

In FIG. 19 there is indicated a variant of FIG. 5, in which the elevating members 20, 20' are arranged offset with respect to each other on both end faces of the storage block 10 and alternatingly convey upward and downward.

Consequently, a strict separation of the drive-in area from the drive-out area is established. The free space between the elevating members 20, 20' can be used for further storage places 12 or places in the store.

Apart from the cuboidal design, any other geometry can be realized, depending on the conditions of the site and the requirements relating to use.

FIGS. 20 to 30 show a variant of the invention in the form of a container store. Here too, the storage block 10 is terminated at its two end faces (entrance area E and outward-transfer side A) by elevating members 120 and 120', respectively. The lowermost level of the storage block 10 serves as a passage for trucks which deliver the containers 14 and fetch them. The passing through of the trucks is controlled by a system equipped with traffic lights 108. If the container store is to be operated without running-around tracks, just with chassis or AGVs (automatic guided vehicles=driverless transport system), for example a chassis enters any desired shaft with the traffic light switched to green and picks up a container 14, whereupon the driver or the control is notified of the destination by radio data transmission. Upon reaching the destination, the specification of the destination is acknowledged, and the driver or the AGV fetches the next container in the same way.

As FIGS. 20 and 21 show in particular, the container store is designed as a steel construction with vertical supports 130, which are interconnected by running rails 110, running in the X direction, and by guide rails 112, running in the Y direction.

FIG. 30 shows the fastening of the cross-sectionally C-shaped running rails 110 by means of gusset plates 114 on a support 130; the guide rails 112 running transversely thereto likewise have a C-shaped cross section and are supported on the running rails 110. For further reinforcement of the system, diagonal braces and trussed frames may be provided, which are not shown any further for reasons of simplicity.

For displacing the containers 14 in the X direction, the driving units 134 are designed as so-called spreaders, which are represented in FIGS. 22 and 26. Each spreader 134 has a bearing frame 116 with two mutually parallel longitudinal struts 118' and four transverse struts 118, connecting the latter. The two outer transverse struts 118 lie in the region of the short outer sides of the rectangular bearing frame 116, while the two central transverse struts 118 are fastened a small distance apart in the central region of the bearing frame 116.

For moving the bearing frame 116 in the X direction, on the outer side of the longitudinal struts 118' there are mounted running rollers 122, which can be driven, at least partially, by hydraulically or electrically acting motors (not shown). The running rollers 122 engage in the C-shaped running rails 110.

Each transverse strut 118 bears a cross member 124, which can be lowered and raised by means of double-acting hydraulic cylinders 128.

In FIGS. 24 and 25 it can be clearly seen that each cross member 124 has at each of its two ends a gripping element 132 (twist lock), which is designed as a locking bolt 136 which can be turned through 90°. For this purpose, the locking bolt is fixedly connected to a swivel arm 138, which is mounted in a recess 140 at the end of the cross member 124 and is connected these by means of a ball joint 148 to an actuating cylinder 144. From the underside of the cross member 124 there protrudes downward, next to the respective locking bolt 136, a securing pin 146, which is movable in height and, when sitting on the upper side of the container 14 or the corner region of the latter (corner casting), releases the turning movement of the locking bolt 136 into its locking position.

For grasping a container 14, the two cross members 124 required for this are lowered by means of the hydraulic cylinders 128, so that, in the position shown in FIG. 24, the locking bolts 136 can engage in corresponding receiving openings on the upper side of the container 14 to be raised. When the locking bolts 136 have been lowered faultlessly into the receiving openings, the assigned securing pin 146 is in its depressed position, in which it releases the turning movement of the locking bolt 136 from the position of FIG. 24 into the engaging position of FIG. 25. There is then established a bayonet-like connection between the locking bolts 136 and the container 14 to be raised, so that subsequently the two cross members 124 can be raised again. Thereafter, the driving unit 134 (spreader) can be moved by means of the running rollers 122 in the running rails 110 to the desired storage place 12.

Within the storage block 10 there is respectively provided on each level a driving unit 134 per line (X direction), which serves for transporting the containers 14 within the line up to in front of the elevating members 120, 120'. The elevating members 120 and 120' also have in each case a driving unit 134 designed in the same way. In this case, each elevating member 120 has a vertically movable lifting unit 150, which is represented in FIG. 23. The lifting unit 150 comprises a rectangular frame 152, which comprises two mutually parallel running rails 110' which are interconnected by transverse bearers 154. The frame 152 is suspended on chains 52', which can be moved vertically by means of a driving unit 54; the driving unit 54 is explained with reference to the example of FIGS. 6 and 7.

Other devices, for example spindles, or hydraulic devices, may also be provided for the height adjustment of the lifting unit 150.

FIG. 26 shows in the upper part a driving unit 134 (spreader) within a lifting unit 150. In order to ensure during moving in and out of the respective "elevating spreader" for the take-over or transfer of a container 14 a transition at the same height from the running rails 110 within the storage block 10 to the running rails 110' of the lifting unit 150, the latter has at the end of the running rails 110' locking pins 156; these ensure a smooth transition of the elevating spreader between the elevating member 120 and the first or last storage place in the storage block 10.

As in the case of the exemplary embodiments explained before, each elevating shaft 142 also has at the corners four guide columns 46', in which there engage guide rollers 158, which are provided at the four corners of the lifting unit 150.

FIG. 29 shows that, on account of the explained distribution of the cross members 124, each spreader is capable of receiving either one long container 14 by its two outer cross members 124 or two short containers 14 by all four cross members 124. It goes without saying that it is also possible to take up just one short container 14 or, by other cross member arrangements, to accept containers of intermediate dimensions or oversized dimensions.

For displacing the containers 14 in the Y direction by in each case one storage place 12 within each row, there are provided rectangular bottom frames 126, which have on their narrow sides running rollers (not shown), which roll in the Y direction in the guide rails 112. In the central region, each bottom frame 126 has additional support rollers 160, which run on supporting rails 162. On each bottom frame 126 there lie bearer plates 36 with guide corners 164 and sprung guide bolts 164', fastened in the central region. The distance between the guide corners 164 and the guide bolts 164' is dimensioned in such a way that small and large containers 14 are held securely on the bottom frame 126.

FIG. 28 shows that each bottom frame 126 is assigned a driving unit 134', which may for example be an electric motor. The driving unit 134' is fastened on the outer side of one of the two running rails 110 for the bottom frame 126 and has a continuous drive shaft 166, the two ends of which are connected by means of a bevel gear 168 each to a drive spindle 170. The two drive spindles 170 of each bottom frame 126 are in engagement with a spindle nut 172, which according to FIG. 27 are fitted on one longitudinal side of the bottom frame 126.

As FIG. 28 shows, the two drive spindles 170 of a bottom frame 126 are arranged offset with respect to the drive spindles 170 of the neighboring bottom frame 126 in order to avoid hindrance of each other.

The number of bottom frames 126 in each row of each level of the storage block 10 corresponds to the number of storage places present there, reduced by 1. Thus, it is possible to displace the respectively desired number of bottom frames 126 together by one storage place, as explained by way of example with reference to the example of FIG. 2.

FIG. 31 shows a possibility for application of the storage block 10 for receiving containers in a port installation. The construction of the storage block 10 is analogous to the examples already described, in particular of FIGS. 1, 2 and 20 to 30.

The elevating members 20 for storage (E) of the containers 14 are combined on one end face of the storage block 10, while the elevating members 20' for outward transfer are combined on the opposite end face (A).

The storage block 10 is constructed on the pier 80 of a port, on which gantry cranes 82 are able to move. Each gantry crane 82 has a container bridge 84 for unloading or loading a ship 86 with containers 14. Underneath the container bridge 84 of each gantry crane 82 there is provided on the latter a buffer level 88, on which there is space for a certain number of containers 14. The buffer levels 88 of all the gantry cranes 82 are interconnected by means of a conveying track 90, which may be designed for example as belt conveyors or chain conveyors. On the longitudinal side of the conveying track 90 facing away from the ship 86 there adjoin two running-around tracks 92 and 92', which convey at right angles to said conveying track and which guide the containers 14 to directly in front of the storage level E of the elevating members 20 or receive the containers 14 surrendered from the storage block 10 behind the elevators 20' and bring them to the conveying track 90.

The two running-around tracks 92 and 92' may be interconnected by buffer tracks 94 running on the longitudinal sides of the storage block 10.

Under the two running-around tracks 92 and 92' there are provided in front of the elevating members 20 and behind the elevating members 20' two further running-around tracks 96, 96', which serve for railroad loading of the containers 14. The corresponding track systems 98 are laid on the longitudinal side of the storage block 10 facing away from the pier 80. There, the two running-around tracks 96 and 96' are interconnected by a conveying track 90' corresponding to the conveying track 90 on the pier side, corresponding crane bridges 100 being provided for railroad loading.

Under the two running-around tracks 96 and 96', which are provided at the end faces and may likewise be interconnected by means of buffer tracks 94' running on the longitudinal sides, there are provided at the two end faces of the storage block 10 two displacing tracks 102, 102', which serve for the purpose of displacing the containers 14 in the Y direction.

In FIG. 20 it can also be seen that a turning platform 104 for turning the individual containers 14 through 180° is integrated into the running-around track 92.

The removal of the individual containers 14 from the storage block 10 takes place in the way already explained, the container picked up in each case being deposited within the storage block 10 at the last place in front of the elevating member 20'. The driving unit of the elevating member 20' picks up the container 14 and places it onto the running-around track 92' for further transport onto the ship 86, onto the running-around track 96' for further transport for railroad loading or onto the displacing track 102', from which the containers 14 are offloaded onto trucks.

The storing of the containers on the E side takes place in the reverse way. Here, the trucks with the delivered containers drive underneath the elevating members 20, where the containers are picked up. After unloading, the truck drives on the lowermost level of the storage block 10, which serves as a passage, until underneath the elevating members 20' on the A side, where it can pick up a surrendered container, which if necessary has been positioned beforehand on the displacing track 102' in the Y direction over the required passage.

The running-around tracks 92, 92' and 96, 96' for railroad loading and ship loading serve at the same time as buffers in the case of a possible backlog and as possible means for alternate storing in the case of technical faults. It is also possible to carry out the ship loading or railroad loading from the storage block system not by means of running-around tracks, but as before by means of AGVs or chassis.

The buffer levels 88 of the gantry cranes 82 serve as a stowing space for the containers 14 during unloading of the ship 86 and during loading. Since they are moved by the gantry cranes 82 and lie at the height of the conveying track 90, further transport without any displacement in height onto the running-around track 92 or from the running-around tracks 92' is possible.

Containers 14 with oversized dimensions, hazardous materials or low-temperature products which are not to be accepted in the storage block 10 can be taken off the conveying track 90 or set down on it by means of conveying bridges 106 (transtrainers) and thus integrated in the overall flow.

The invention combines the following advantages of known rack storage systems:
direct access to each individual storage place in a way corresponding to a high-bay warehouse
fast throughput as in the case of a dynamic rack system
low space requirement as in the case of a sliding rack system.

I claim:

1. An apparatus for storing objects on pallets in a storage block, having identical storage places arranged behind, next to and above one another in X, Y and Z directions, and at least one elevating means for raising and lowering the objects in the storage block in the Z direction to different levels, each storage place being equipped with a driving unit for displacing the objects in the Y direction and driving units being provided for displacing the objects in the X direction between an entrance area and an outward-transfer side of the storage block, wherein each respective row of storage spaces in the X direction includes at least one free storage place (12) so that the free storage places are staggered in the X direction and one level of the storage block (10) is configured as a storage and return level for empty pallets.

2. The apparatus as claimed in claim 1, wherein the lowermost level of the storage block (10) serves as a storage and return level.

3. The apparatus as claimed in claim 1, wherein each of the storage spaces is configured as a separate structural unit so that the storage block has a modular configuration.

4. The apparatus is claimed in claim 3, wherein each individual storage place includes a basic element (24) with a bottom frame (26) and vertical columns and also a displacing module (32) mounted on the bottom frame for displacing an object.

5. The apparatus as claimed in claim 4, wherein the displacing module (32) is fitted into the bottom frame (26).

6. The apparatus as claimed in claim 4, wherein each storage place (12) has a bearer plate (36) arranged to rest on the displacing module (32) so as to be displacable by the displacing module.

7. The apparatus as claimed in claim 6, wherein the displacing module (32) includes at least one driving units (34) for displacing the bearer plates (36) in the X direction or in the Y direction, the driving unit (34) being in engagement by a gear wheel (38) with a toothed rack (40) on an underside of the bearer plate (36).

8. The apparatus as claimed in claim 1, wherein the elevating means includes shaft elements (42) vertically connected in a modular manner.

9. The apparatus as claimed in claim 8, wherein the elevating means (20) has an upper end at which one of the driving units is provided, and a lower end at which a deflecting device (60) is arranged, conveying chains (52) being mounted between the driving unit and the deflecting device.

10. The apparatus as claimed in claim 9, wherein one of the driving units (34) for displacing the objects (14) in the X direction is mounted on the deflecting device.

11. The apparatus as claimed in claim 8, and further comprising a preparation station (22) arranged directly adjacent the elevating means and including a lifting platform (64).

12. The apparatus as claim in claim 1, wherein the storage places (12) have a bottom frame (126) which can be displaced in the Y direction by means of running rollers in guide rails (112).

13. The apparatus as claimed in claim 12, wherein each bottom frame (14) is connected via at least one drive spindle (170) to the driving unit (134') for displacing in the Y direction, which unit is fixedly installed in the storage block (10).

14. The apparatus as claimed in claim 1, wherein the driving units (134) for displacing the objects (14) in the X direction have a bearing frame (116) which can be moved by means of running rollers (112) in the X direction in running rails (110) and bears on its underside at least two vertically adjustable cross members (124) with gripping elements (132) for seizing the objects (14) from above.

15. The apparatus as claimed in claim 14, wherein at least some of the running rollers (112) are drivable.

16. The apparatus as claimed in claim 14, wherein the bearing frame (116) bears in the region of its short outer sides two cross members (124) and in the central region at least two further cross members (124).

17. The apparatus as claimed in claim 14, wherein the gripping elements (132) are locking bolts (136) which can be turned through 90° and are intended for engagement in receiving openings of the objects (14) designed as containers.

18. The apparatus as claimed in claim 17, wherein each locking bolt is assigned a securing pin (146) which can be moved in height and, when sitting on an upper side of the object (14), releases a turning movement of the locking bolt (136) into its engaging position.

19. The apparatus as claimed in claim 14, wherein the bearing frame (116) is equipped with a weighing device, which can be connected to a central control.

20. The apparatus as claimed in claim 14, wherein the elevating member (120) has a frame (152) which can be moved vertically in a shaft (142), has two mutually parallel running rails (110) and is intended for receiving a bearing frame (116).

21. The apparatus as claimed in claim 1, wherein a movable fire-extinguishing container is accommodated in the storage block (10).

22. The apparatus as claimed in claim 1, and further comprising at least one conveyor means (92, 96), externally connected to the storage block (10) for transporting the objects (14).

23. The apparatus as claimed in claim 22, wherein the conveyor means (92, 96) are arranged at different heights.

24. The apparatus as claimed in claim 22, wherein a turning platform (104) for the objects (14) is integrated in the at least one conveyor means (92).

25. The apparatus as claim in claim 22, wherein at least conveyor means (92, 96) is connected to at least one of a buffer level (88) and a buffer track (94) for the objects (14).

26. The apparatus as claimed in claim 1, and further comprising a track member arranged adjacent the elevating means on at least one outer side (18) of the storage block (10) so that the objects (14) can be held thereon and moved in the Y-direction.

27. The apparatus as claimed in claim 1, wherein the storage block (10) has a lowermost level configured as a passage for trucks.

28. The apparatus as claimed in claim 1, wherein a registering device for detecting data of delivered objects (14) is arranged in the entrance area (E), the detected data being stored in a computer and processed for relocating and surrendering the object (14).

* * * * *